United States Patent [19]
Ishida et al.

[11] Patent Number: 5,389,971
[45] Date of Patent: Feb. 14, 1995

[54] IMAGE SENSOR PROVIDED ON A CHIP AND HAVING AMPLIFYING MEANS

[75] Inventors: Tokuji Ishida; Toshio Norita; Jun Hasegawa, all of Osaka, Japan

[73] Assignee: Minolta Camera Kabushiki Kaisha, Osaka, Japan

[21] Appl. No.: 801,895

[22] Filed: Dec. 3, 1991

Related U.S. Application Data

[60] Continuation of Ser. No. 593,863, Oct. 5, 1990, Pat. No. 5,083,207, which is a division of Ser. No. 298,998, Jan. 19, 1989, Pat. No. 4,985,774.

[30] Foreign Application Priority Data

| | | |
|---|---|---|
| Jan. 20, 1988 [JP] | Japan | 63-10245 |
| Feb. 10, 1988 [JP] | Japan | 63-31381 |
| Feb. 10, 1988 [JP] | Japan | 63-31382 |
| Feb. 10, 1988 [JP] | Japan | 63-31383 |
| Feb. 10, 1988 [JP] | Japan | 63-31384 |
| Feb. 10, 1988 [JP] | Japan | 63-31385 |
| Feb. 10, 1988 [JP] | Japan | 63-31386 |
| Feb. 10, 1988 [JP] | Japan | 63-31387 |
| Feb. 10, 1988 [JP] | Japan | 63-31388 |
| Feb. 10, 1988 [JP] | Japan | 63-31389 |
| Feb. 10, 1988 [JP] | Japan | 63-31390 |
| Feb. 10, 1988 [JP] | Japan | 63-31391 |
| Feb. 10, 1988 [JP] | Japan | 63-31392 |
| Feb. 10, 1988 [JP] | Japan | 63-31393 |

[51] Int. Cl.[6] .......................................... H04N 5/225
[52] U.S. Cl. ...................................... 348/294; 348/300
[58] Field of Search .............. 358/213.19, 213.11, 358/214, 50, 213.26, 228; 357/30 H; H04N 3/14, 5/335; 348/294, 300, 297

[56] References Cited

U.S. PATENT DOCUMENTS

| | | | |
|---|---|---|---|
| 4,264,921 | 4/1981 | Pennington | 358/50 |
| 4,558,366 | 12/1985 | Nagumo | 358/213.15 |
| 4,584,656 | 4/1986 | Sakai et al. | 358/213.19 |
| 4,589,079 | 5/1986 | Peter | 358/213.11 |
| 4,592,029 | 5/1986 | Altmann et al. | 358/213.11 |
| 4,654,681 | 3/1987 | Jastrzebski | 357/30 H |
| 4,712,136 | 12/1987 | Tsunekawa et al. | 358/213.15 |
| 4,763,007 | 8/1988 | Takahashi | 358/213.11 |
| 4,763,189 | 8/1988 | Komatsu et al. | 357/30 H |
| 4,825,291 | 5/1989 | Mimura et al. | 358/213.19 |
| 4,876,603 | 10/1989 | Suzuki et al. | 358/228 |
| 4,914,519 | 3/1990 | Hashimoto et al. | 358/213.15 |
| 4,987,494 | 1/1991 | Freeman | 358/213.11 |
| 5,038,214 | 8/1991 | Miida | 358/213.19 |
| 5,097,339 | 3/1992 | Ishida et al. | 358/213.19 |

FOREIGN PATENT DOCUMENTS

| | | | |
|---|---|---|---|
| 58-068376 | 4/1983 | Japan | 358/213.19 |
| 59-223080 | 12/1984 | Japan | 358/213.19 |

*Primary Examiner*—Joseph Mancuso
*Assistant Examiner*—Wendy R. Greening
*Attorney, Agent, or Firm*—Burns, Doane, Swecker & Mathis

[57] ABSTRACT

In an image sensor provided on a chip, there are a plurality of photodiodes for receiving light. The photodiodes are disposed in at least two rows which are spaced apart from one another. An elongated photodiode which is at least partially covered by a light shield is used to monitor the photodiodes in the first and second rows. The outputs from image sensor are amplified by first and second amplifiers which are also located on the same chip as the image sensor.

8 Claims, 19 Drawing Sheets

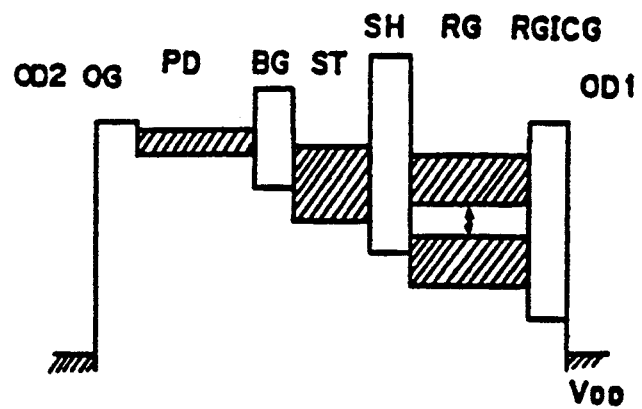
FIG. 3(a)
FIG. 3(b)
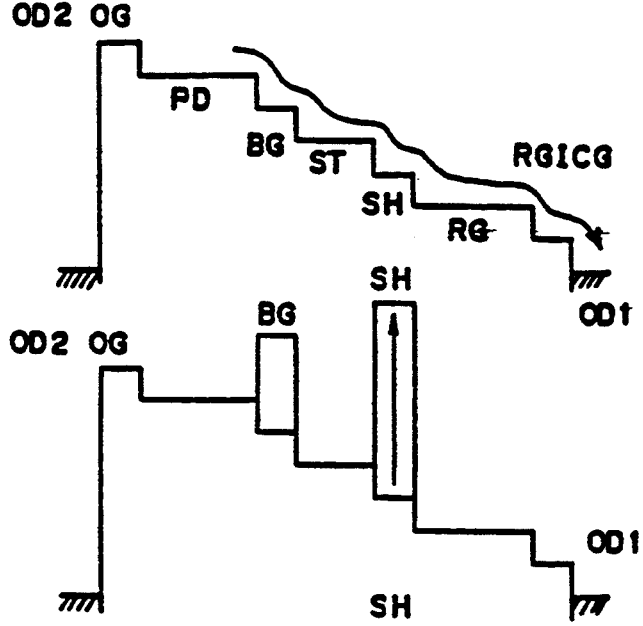
FIG. 3(c)
FIG. 3(d)
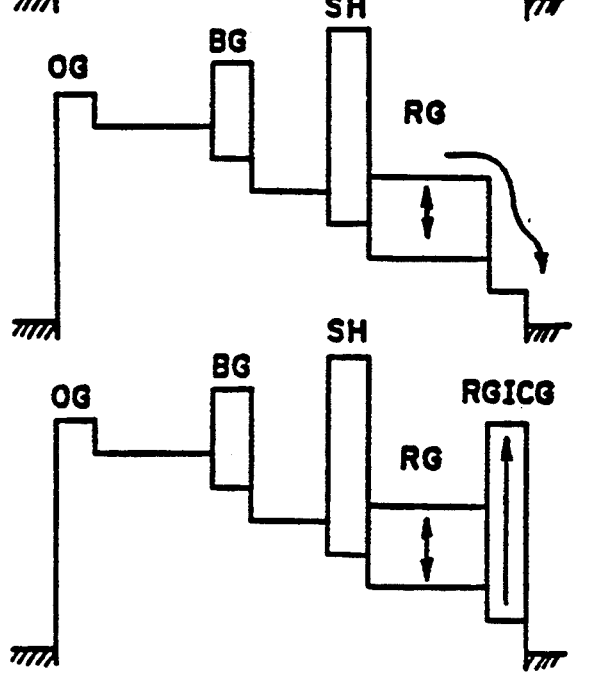
FIG. 3(e)

FIG. 7(a)
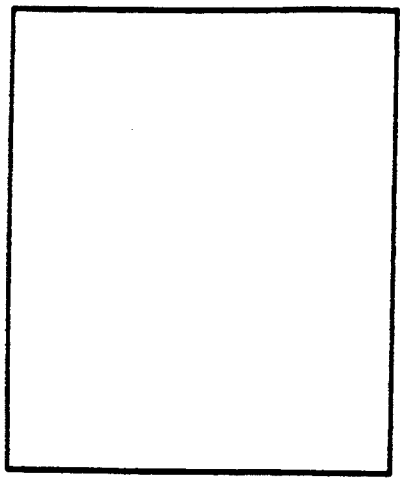
Peripheral Length Lb
FIG. 7(b)
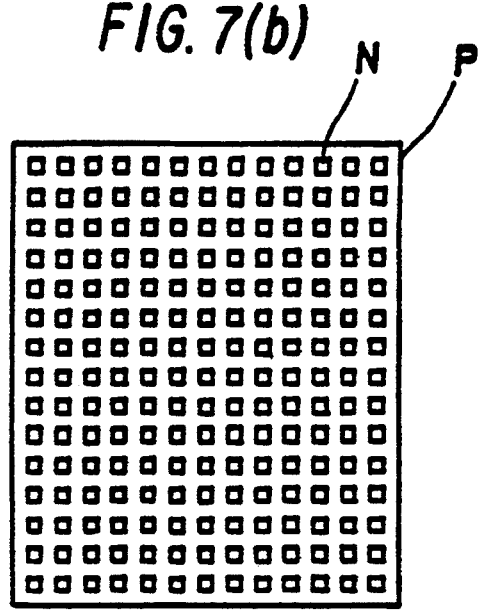
Peripheral Length La
La = 7.7Lb
Fig. 8
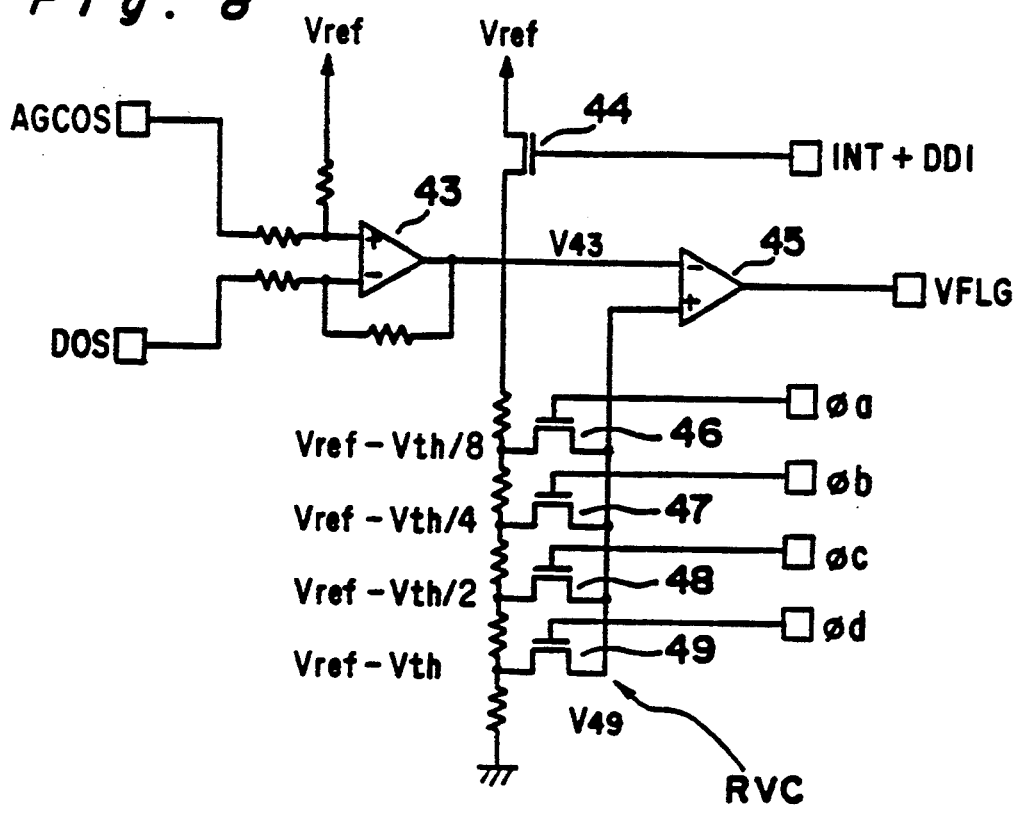

Fig. 9
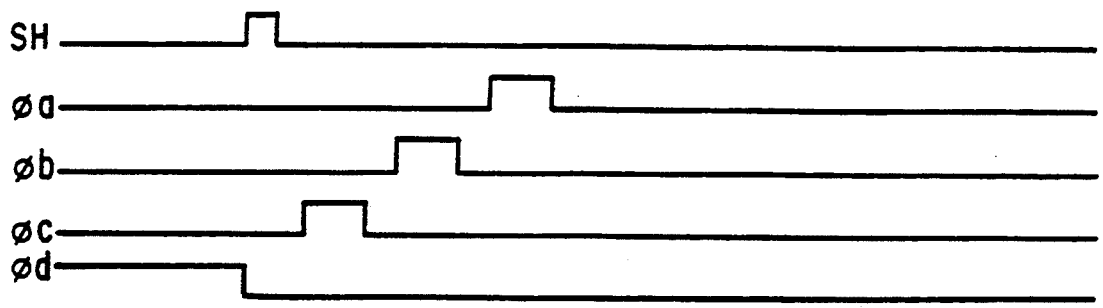
Fig. 24
| Q1 | Q2 | Q3 | G1 | G3 | Gain |
|----|----|----|----|----|------|
| H | H | H | H | H | x 8 |
| L | H | H | H | L | x 16 |
| L | L | H | L | H | x 32 |
| L | L | L | L | L | x 64 |
Fig. 10
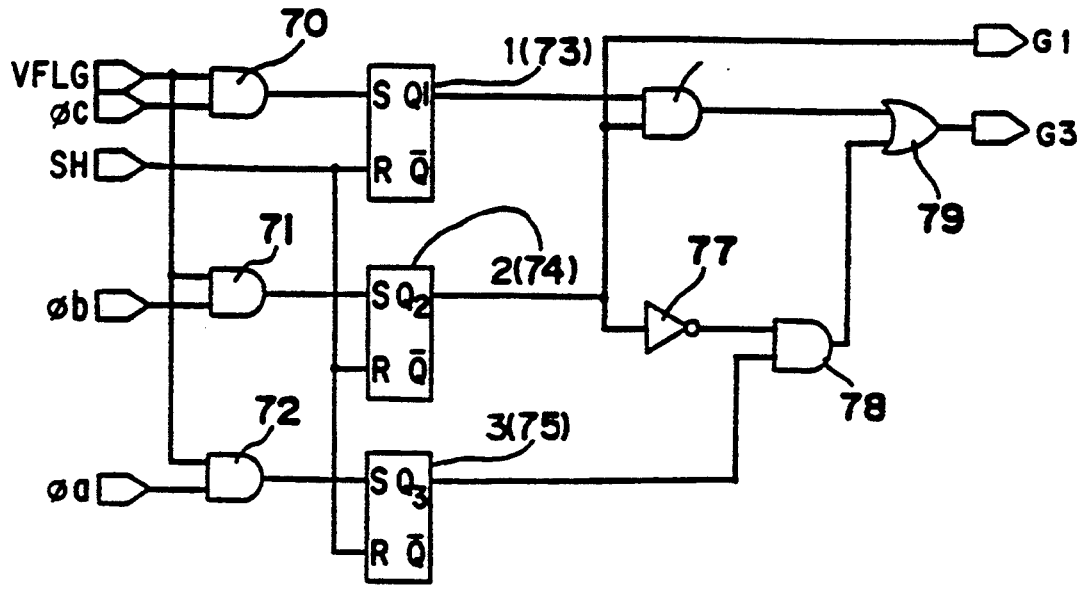

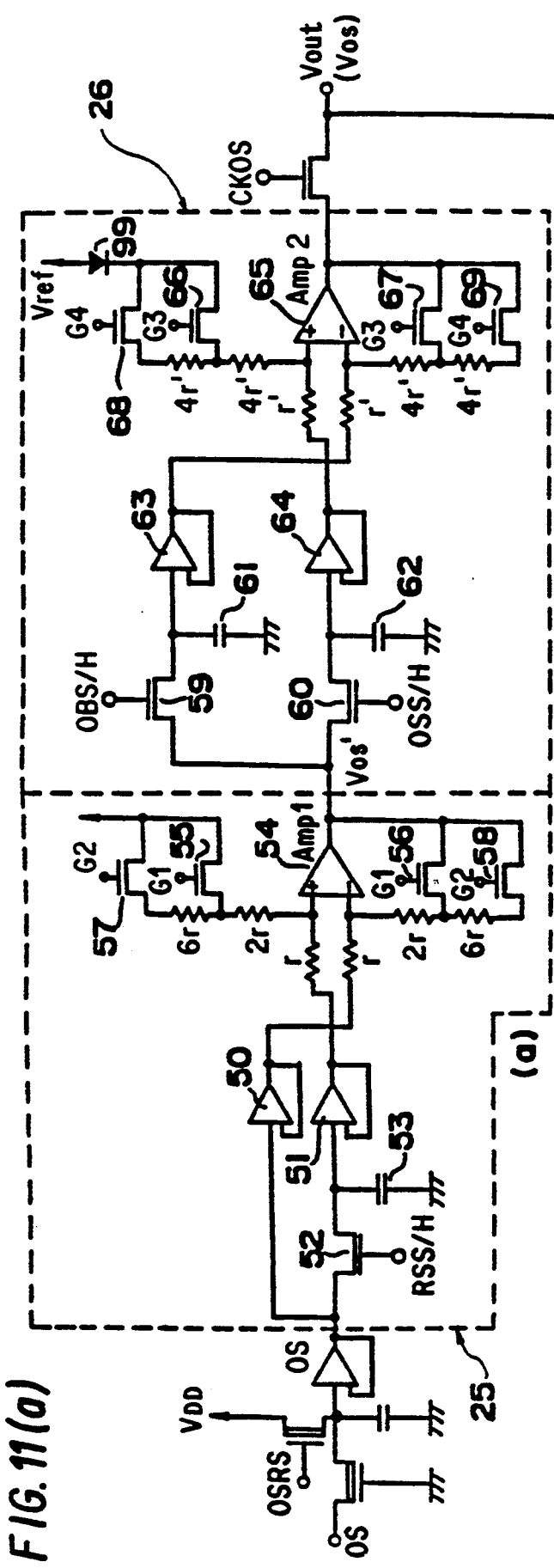
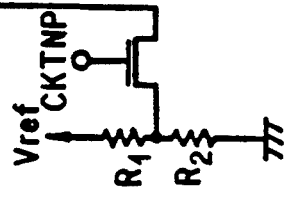
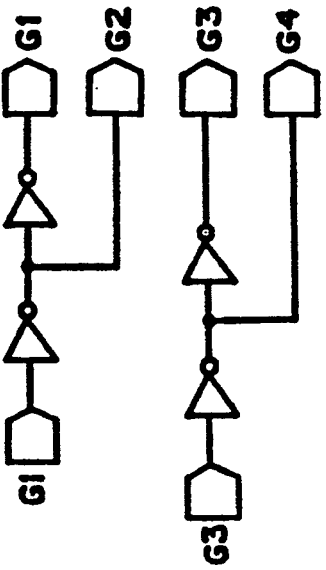
FIG. 11(a)
FIG. 11(b)
FIG. 11(c)

| | Amp 1 | Amp 2 |
|---|---|---|
| Gain 8 | x2 | x4 |
| Gain 16 | x2 | x8 |
| Gain 32 | x8 | x4 |
| Gain 64 | x8 | x8 |

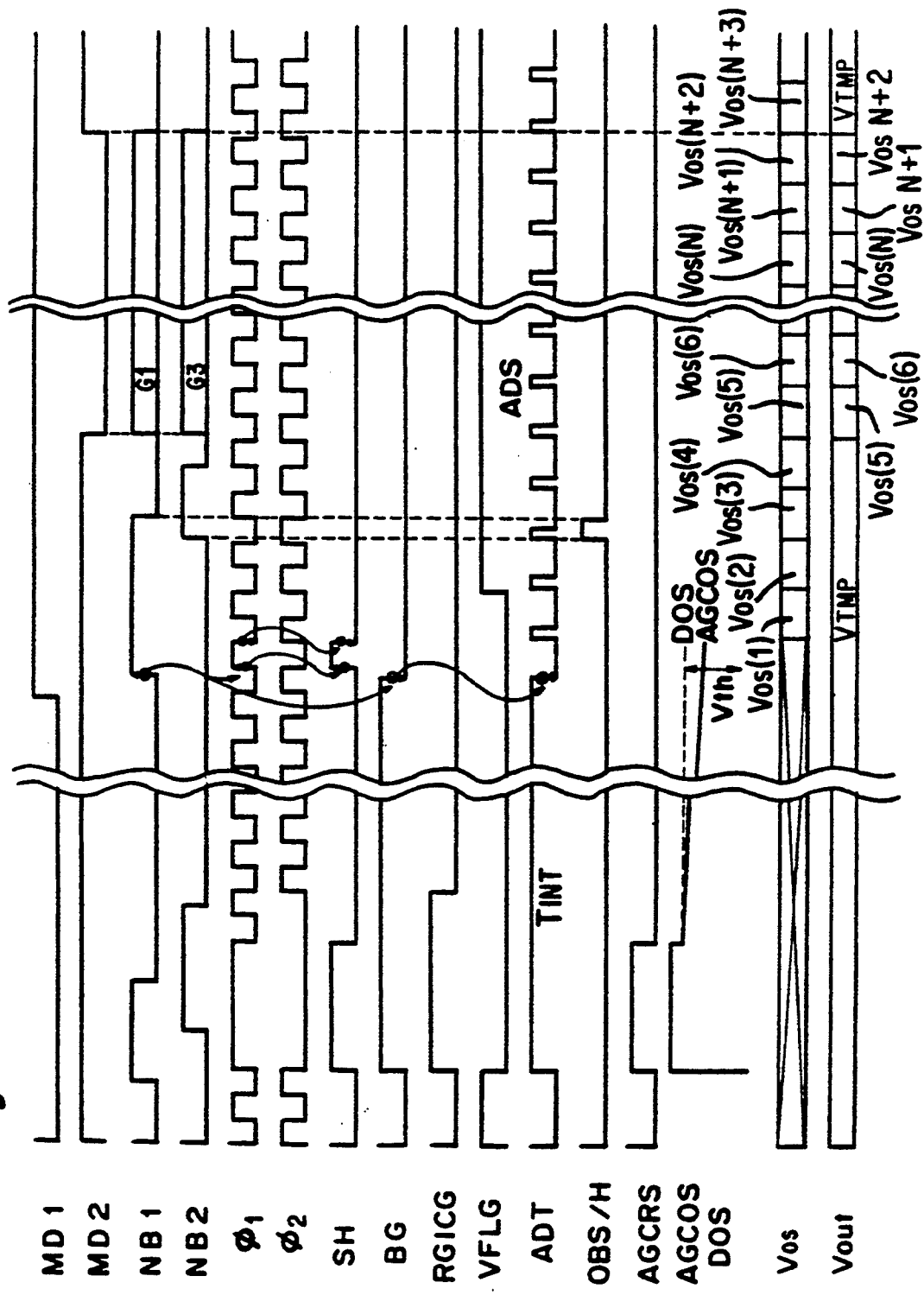

Standing condition    Transfer Direction →

Dark charge

After Clearance

After 1 clock

↑ Standing

After 2 clocks

↑ Standing   ↑ Standing

IMAGE SENSOR PROVIDED ON A CHIP AND HAVING AMPLIFYING MEANS

This application is a continuation of application Ser. No. 07/593,863, filed Oct. 5, 1990, U.S. Pat. No. 5,083,207, which is a divisional of 07/298,998, filed Jan. 19, 1989, now U.S. Pat. No. 4,985,774.

BACKGROUND OF THE INVENTION

1. Field of the Invention

The present invention relates to an image sensing imaging device used in an automatic focus detecting system of a photographic camera.

2. Description of the Prior Art

Hitherto, this type of image sensing device is disclosed in, for example, the Japanese Laid-open Patent Publication No.60-125817. The image sensing device disclosed therein is constructed in the form of a CCD (charge-coupled device) and has an accumulator, a drain and an integration clear gate, all of which are arranged between a plurality of photo-diodes as a photoelectric converter and a transfer register. When unnecessary charge is to be drained from the transfer register at the time of initialization, the frequency of transfer clocks is increased to minimize the time required for the initialization.

According to the Japanese Patent Publication No.61-17387, there is disclosed an image sensing device wherein, in order to determine the integrating time, both of a gate provided between the accumulator and the transfer register and a gate provided between the transfer register and the drain are opened for a predetermined time so that the unnecessary charge of both of the accumulator and the transfer register can be drained to the drain, but both of said gates are closed during the integration so that the integration can take place only during a period corresponding to the difference between the predetermined time and the time required for the drainage of the unnecessary charge, the first mentioned gate being opened pulse-wise upon the termination of the integration to transfer the charge accumulated in the accumulator to the transfer register.

However, in the first mentioned image sensing device, although the unnecessary charge can be drained from the accumulator through the integration clear gate, the direct drainage of the unnecessary charge of the transfer register is not possible. Therefore, the frequency of the transfer clocks is necessarily increased during the initialization to facilitate the drainage of the unnecessary charge of the transfer register. The increase of the frequency of the transfer clocks brings about such a problem that a drive circuit for generating the transfer clocks may become complicated in structure. Also, in the first mentioned image sensing device, since the integration clear gate and other gates are, in addition to the accumulator, provided between the photo-diode and the transfer register, the intervention of the integration clear gate and the other gates provides an obstruction to the reduction in pitch between each neighboring picture elements.

In the second mentioned image sensing device, although the time required to accomplish the integration is in effect short where an object aimed to be photographed is very bright, the integrating cycle actually taking place in such device is fixed at the predetermined time. Therefore, as compared with the case in which the integrating time varies with brightness of the object, the time required to give an integrating data for each occasion tends to become long. Accordingly, where this integrating data is to be used in the focus detection in the photographic camera, a problem will arise in that the cycle of focus detection does not follow the movement of the object. Moreover, where the object is dark, another problem will arise in that the photoelectrically converted output is low in the case of the predetermined time of the integrating cycle and, therefore, no integrating data effectively utilizable in the subsequent stage can be obtained.

SUMMARY OF THE INVENTION

Accordingly, the present invention has for its essential object to provide an improved image sensing device wherein the unnecessary charge of the transfer register can be drained directly thereby to obviate the use of a complicated transfer clock generator whereby the time required for the initialization can be reduced and the pitch between each neighboring picture elements can also be reduced.

In order to accomplish the above described object, the improved image sensing device herein disclosed comprises a light receiving means, having a plurality of light receiving elements, for receiving light of an image formed thereon to produce a plurality of electric charges corresponding to the intensity of light received by said plurality of light receiving elements; an accumulating means, connected with said plurality of light receiving elements, for accumulating the plurality of electric charges produced by said light receiving means; a transferring means for transferring said accumulated electric charges in response to a predetermined transfer clock; a discharge means for discharging electric charges received; a first gate means, provided between said accumulating means and said transferring means, for controlling the transference of the accumulated electric charges to said transferring means; a second gate means, provided between said transferring means and said discharge means, for controlling the transference of the electric charges in said transferring means to said discharge means; and a gate control means for controlling said first and second gate means so that the transference of electric charges through said first and second gate means is interrupted for performing the accumulation of said accumulating means, and the transference of accumulated electric charges through said first gate means to said transferring means is permitted after the accumulation of said accumulating means is terminated, and the transference of electric signals through said first and second gate means to said discharge means is permitted prior to commencement of the accumulation for discharging unnecessary charges in said accumulating means and said transferring means.

Accordingly, not only can the unnecessary charge be quickly drained thereby to shorten the time required for the initialization, but also the frequency of the transfer clocks need not be increased. Also, since no integrating clear gate is necessary between the accumulating means and the transfer register, the pitch between each neighboring picture elements can be minimized.

BRIEF DESCRIPTION OF THE DRAWINGS

This and other objects and features of the present invention will become clear from the following description taken in conjunction with preferred embodiments thereof with reference to the accompanying drawings, in which:

FIGS. 3a–3e illustrate diagrams of potential structures of the image sensor during an initializing mode;

FIGS. 7a–7b illustrate the structure of a compensator diode;

FIG. 8 is a circuit diagram showing a brightness determining analog circuit;

FIG. 9 is a timing chart showing various signals during a brightness determination;

FIG. 10 is a block circuit diagram of a brightness determining logic circuit;

FIGS. 11a–11c are circuit diagrams showing AGC operational amplifier and OB subtracting AGC operational amplifier used in the first embodiment of the present invention;

FIG. 22 is a timing chart showing various signals during the integrating mode in the fourth embodiment of the present invention;

FIG. 24 is a logic truth table of the brightness determining logic circuit.

DETAILED DESCRIPTION OFT HE EMBODIMENTS

Figure 1:
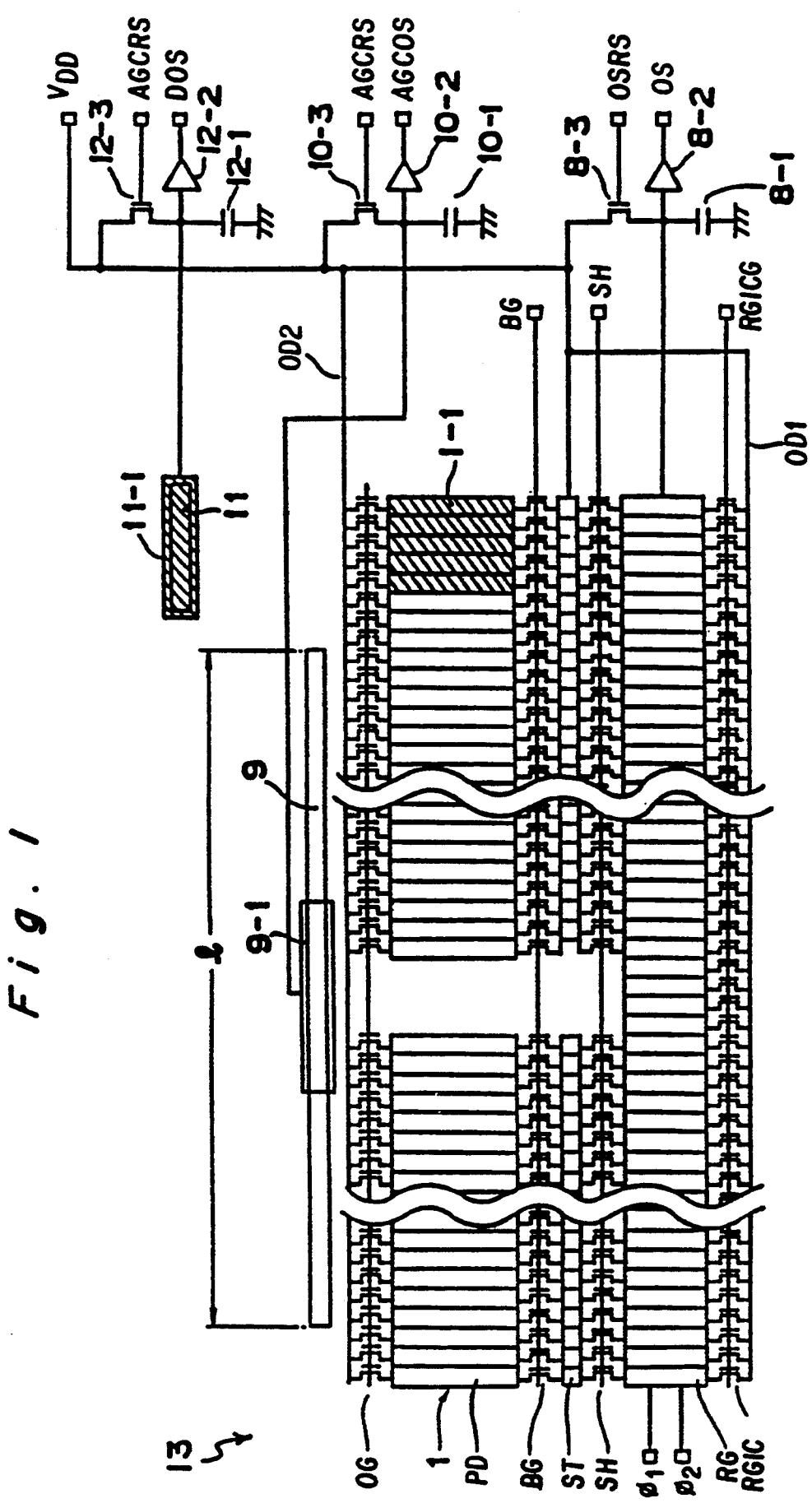
FIG. 1 is a diagram showing the structure of an image sensor in a solid-state imaging device according to the present invention.

Referring first to FIG. 1 showing the structure of an image sensor 13 manufactured in the form of a charge-coupled device (CCD). The image sensor 13 comprises a photo-diode array including a plurality of photo-diodes PD which serve as a photoelectric converting means and which generate a charge proportional to the amount of light incident thereupon, accumulators ST for accumulating charges generated by the photo-diodes PD, and barrier gates BG composed of field effect transistors which serve as gates disposed between the photo-diodes PD and the accumulators ST. The barrier gate BG, when applied with a voltage, connects the photo-diode PD and the accumulator ST together to permit the charge generated by the photo-diode PD to flow into the accumulator ST. However, when applied with no voltage, the barrier gate BG disconnects the photo-diode PD from the accumulator ST to interrupt the flow of the charge generated by the photo-diode PD into the accumulator ST. Reference character RG represents transfer registers adapted to be driven on two-phase drive basis for transferring the charge from left to right as viewed in FIG. 1, reference character SH represents shift gates composed of field effect transistors which serve as gates disposed between the accumulators ST and the transfer registers RG. The shift gate SH connects the accumulator ST and the transfer register RG together, when applied with a voltage, for shifting the charge accumulated in the accumulator ST to the transfer register RG, but disconnects the accumulator ST from the transfer register RG to interrupt the flow of the charge accumulated in the accumulator ST into the transfer register RG when applied with no voltage. Reference character RGICG represents integration clear gates composed of field effect transistors which are gates. This integration clear gates RGICG is operable to connect the transfer registers RG and an overflow drain OD1 together during the application of a voltage so that, prior to the integration, unnecessary charges in the photo-diode PD for each picture element and the accumulators ST can be drained from the transfer registers RG to the overflow drain OD1. The overflow drain OD1 is connected with a power source voltage VDD and is held at the lowest potential.

Overflow gates OG are disposed between each photo-diode PD and an overflow drain OD2 which is held at a potential lower than the potential of the barrier gate BG at all times during the non-application of the voltage without a voltage being applied to the overflow gate OG. The charge of each picture element which has been shifted to the transfer register RG is sequentially transferred from the right, as viewed in FIG. 1, to a capacitor 8-1 in response to transfer clocks $\phi 1$ and $\phi 2$. Prior to the transfer of the charge, the capacitor 8-1 is charged and reset to the power source voltage in response to an OSRS signal applied to the gate of a field effect transistor 8-3. Subsequently, the potential of the capacitor 8-1 is lowered from the charged voltage in a quantity corresponding to the charge which has been transferred. A voltage across the capacitor 8-1 is taken as an OS signal by a buffer 8-2. It is to be noted that, although what has been shown by reference numeral 8-1 has been shown and described as a capacitor, it can be substituted by a PN junction of a diode and, where the circuit is to be integrated, the capacitor is fabricated in the form of the diode. Hereinafter, a similar description applies whenever reference to the capacitor is made in the description to follow.

A light-shielding aluminum film 1-1 is laid over some of the photo-diodes PD which are located at one end portion of the photo-diode array 1 for obtaining an output indicative of a dark reference picture element. Opposite blocks of the photo-diodes of the photo-diode array 1 which are generally located adjacent the opposite end portions of the array 1 are used for actual automatic focus detection and, therefore, a central block of the photo-diodes of the photo-diode array 1 which is located intermediate between such opposite blocks correspond to picture elements which are not used for the actual automatic focus detection. Because of this, the photo-diodes falling within the central block and corresponding to the picture elements not used for the actual automatic focus detection are removed and, instead thereof, a portion of a circuit for processing an output from a brightness monitoring photo-diode 9 for the brightness monitoring which constitutes a brightness monitoring means is inserted therefor. (See FIG. 21).

Figure 21:
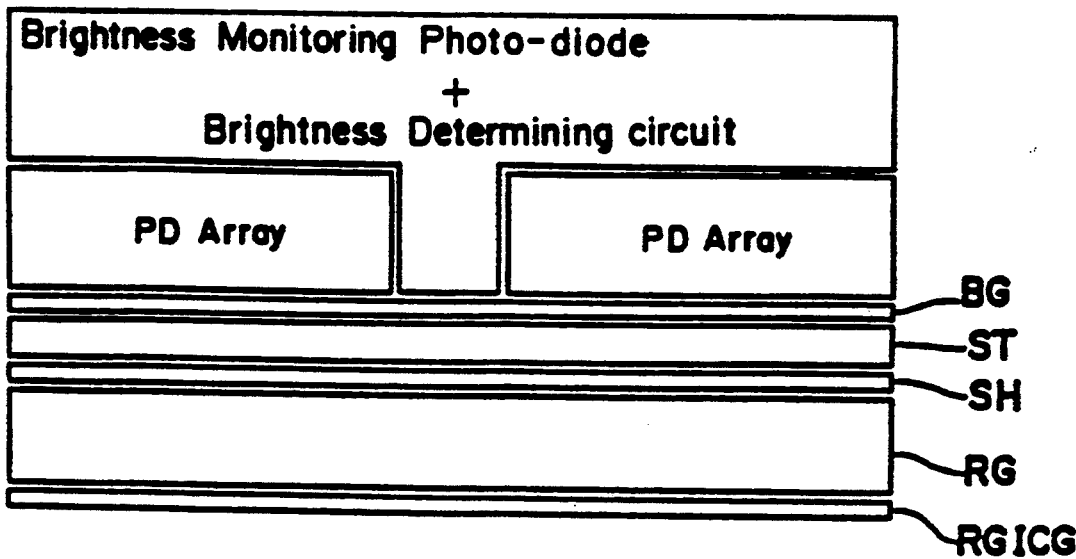
FIG. 21 is a diagram showing the structure of the image sensor.
Figure 23A:
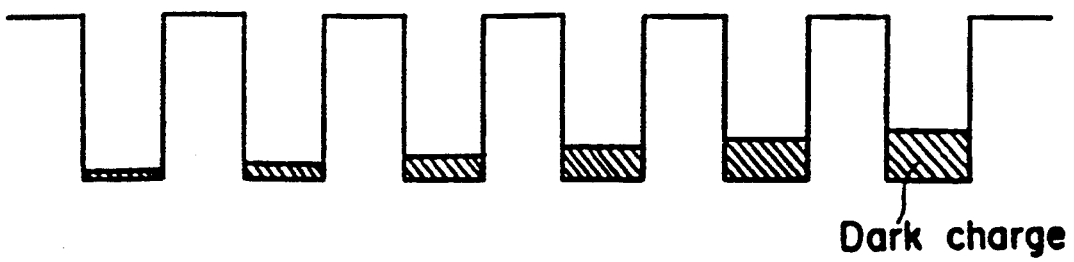
FIGS. 23a–23d are diagrams used to explain the transfer of a dark charge.
Figure 23B:
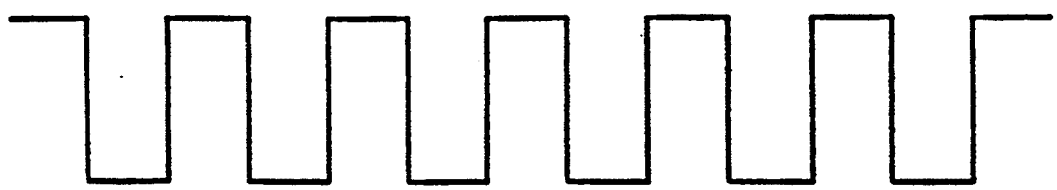
Figure 23C:
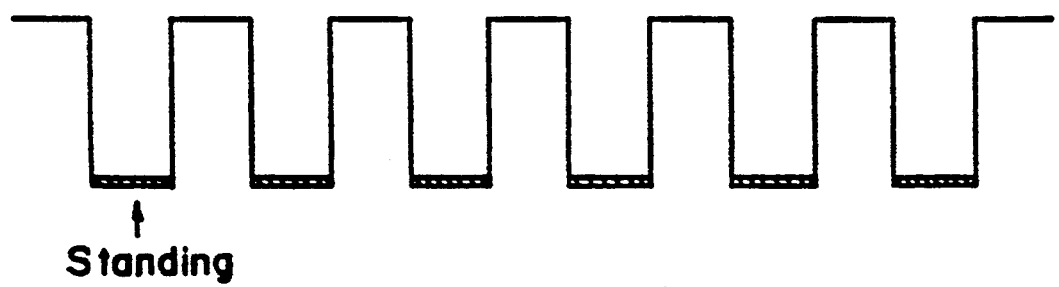
Figure 23D:
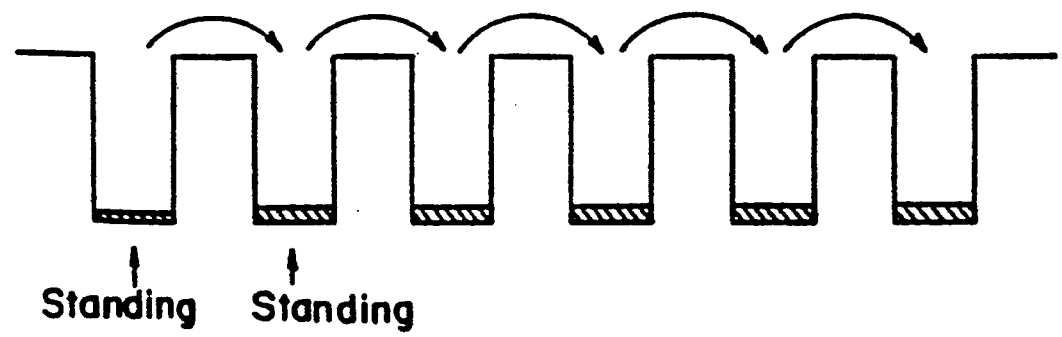

In order to control the integrating time of the image sensor 13, there is provided the brightness monitoring photo-diode 9 which constitutes the brightness monitoring means for monitoring the amount of light incident upon the photo-diode PD. This brightness monitoring photo-diode 9 is arranged along the opposite blocks of the photo-diode array 1 which are used for the automatic focus detecting system and, therefore, assumes a generally elongated shape. Also, the brightness monitoring photo-diode 9 has a portion corresponding to the picture elements not used in the automatic focus detecting system, which portion is shielded from light by an aluminum film 9-1 so that the amount of light radiated towards a region corresponding to the picture elements not used in the automatic focus detecting system will not be monitored. As hereinbefore described, since the brightness monitoring photo-diode 9 is arranged so as to have its longitudinal sense laid parallel to the direction in which the photo-diodes of the photo-diode array 1 are arranged with its opposite ends extending over the opposite blocks of the photo-diode array 1 and, at the same time, so as to have an intermediate portion, corresponding to the picture elements not used in the automatic focus detecting system, shielded by the aluminum film 9-1, the average output level of that portions corresponding to the picture elements actually used in the automatic focus detecting system can be monitored accurately. A portion of the circuit for processing the output from the brightness monitoring photo-diode 9 is shown in FIG. 21 and is inserted in that area which has originally occupied by some of the photo-diodes PD of the photo-diode array 1 which have been removed.

As hereinbefore described, the brightness monitoring photo-diode 9 is of an elongated shape having a length l. Where an output is taken from one end of the brightness monitoring photo-diode 9, the response time $\tau$ is generally in proportion to the square of the length l and, the greater the length l, the worse the response time $\tau$. Accordingly, in order to avoid any deterioration in response time, an output is taken out from a lead-out electrode in the vicinity of a center of the brightness monitoring photo-diode 9. Because of this, as compared with the case in which a contact is provided at one end of the photo-diode 9, the response time is ¼ as shown by the following equation.

$$(l/2)^2/l^2 = \tfrac{1}{4}$$

Thus, since the lead-out electrode is provided in the vicinity of the center of the brightness monitoring photo-diode 9 and the response thereof is accordingly high, no excessive integration for storing the charge in the accumulators ST will take place even if the integrating time is fixed on the basis of the output from the brightness monitoring photo-diode 9 and a proper integration can be carried out.

A capacitor 10-1 is connected to the brightness monitoring photo-diode 9. When an AGCRS signal is applied to the gate of a field effect transistor 10-3 prior to the integration of the image sensor 13, the capacitor 10-1 is charged to the power source voltage VDD. After the removal of the AGCRS signal, the potential in the capacitor 10-1 is lowered by the charge generated in correspondence with the radiation of light. This potential is outputted as an AGCOS signal through a buffer 10-2 which is an output means.

A compensator diode 11 is provided for the removal of a dark output from the brightness monitoring photo-diode 9 and a light shielding aluminum film 11-1 is laid thereover. This compensator diode 11 is so designed as to provide an output of an quantity equal to the dark output from the brightness monitoring photo-diode 9. However, if the compensator diode 11 is designed to be of the same construction as the brightness monitoring photo-diode 9, the same area as the brightness monitoring photo-diode 9 is required and, therefore, the chip size will be increased. Because of this, the compensator diode 11 is, as shown in FIG. 7(b), so designed as to be composed of a plurality of portions wherein N-type regions are separated and arranged at predetermined intervals, which are in turn embedded in a P-type region so that the length (peripheral length) La of the PN junction at a surface which is a source of the dark output can be increased, wherefore the dark output of a quantity comparable to the brightness monitoring photo-diode 9 can be obtained from the compensator diode 11 of a size smaller than that of the brightness monitoring photo-diode 9.

The compensator diode 11 is connected with a capacitor 12-1. This capacitor 12-1 is adapted to be charged to the power source voltage VDD by an AGCRS signal applied to the gate of a field effect transistor 12-3 prior to the integration of the image sensor 13. However, after the removal of the AGCRS signal, the potential of the capacitor 12-1 is gradually lowered by a dark output charge from the compensator diode 11. This potential is outputted as a DOS signal through a buffer 12-3. The foregoing is a full description of the structure of the image sensor 13.

Figure 2:
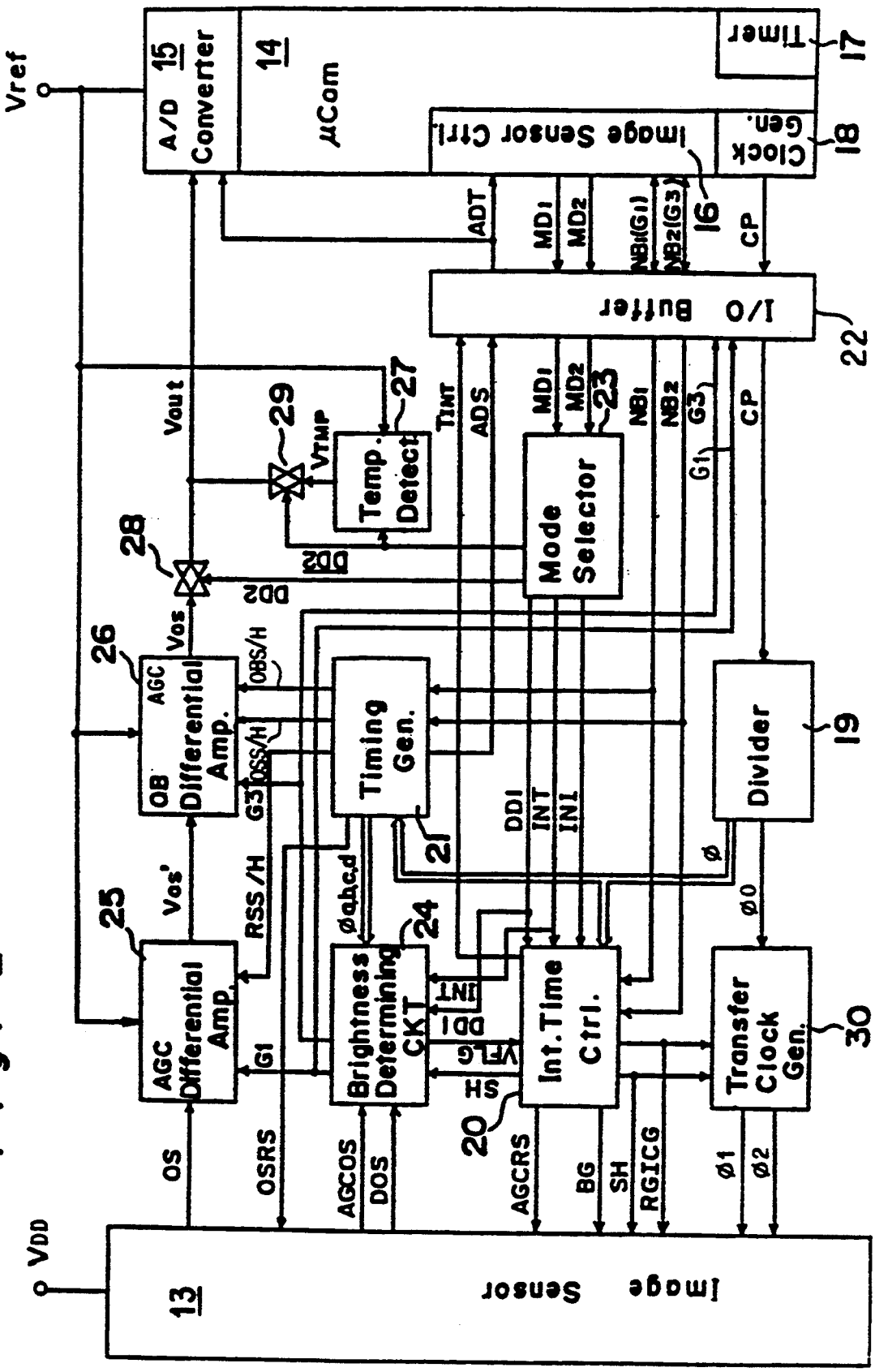
FIG. 2 is a circuit block diagram of the solid-state imaging device according to a first preferred embodiment of the present invention.

Hereinafter, the structure of an overall hardware including the image sensor, a microcomputer and various interface circuits between them will now be described with reference to FIG. 2. In FIG. 2, reference numeral 14 represents a microcomputer ($\mu$Com) which is a calculating and control means capable of effecting a drive control of the image sensor 13. This microcomputer 14 has an image sensor controller 16 from which two signals MD1 and MD2 for switching over among four modes of the image sensor 13 as will be described later of the and also two signals NB1 and NB2 for giving operating timings are generated, and to which an ADT signal which is a logical sum of an TINT signal, indicative of whether or not the integration has been completed, and an ADS signal indicative of the start of an analog-to-digital conversion of an output from the image sensor 13 is applied from an I/O buffer 22. Gain information signal G1 and G3 are also supplied from the I/O buffer 22 to the image sensor controller 16 through respective buses for the NB1 and NB2 signals.

A circuit on a left-hand side of the microcomputer 14 is formed on one chip of integrated circuit within this, the I/O buffer 22 has a function of taking a logical OR between the TINT signal and the ADS signal to provide the ADT signal which is supplied to the microcomputer 14, a function of switching over between input and output of a signal line for NB1 and NB2 signals so that, when inputting, NB1 and NB2 signals are inputted from the microcomputer 14, but when outputting, G1 and G3 signals are outputted to the microcomputer 14, and a function of interfacing among signal levels within circuits such as a frequency divider 19, an integrating time controller 20, a signal processing timing generator 21 and a transfer clock generator 30.

On the other hand, a mode selector 23 is a circuit for decoding MD1 and MD2 signals and for selecting one of the following four modes. When MD1="L" and MD2="L", the mode selector 23 renders only INI signal to be in a high level state and selects INI mode. INI mode is a mode in which initialization of the image sensor 13 is carried out. When MD1="L" and MD2="H", the mode selector 23 renders only INT signal to be in a high level state and selects INT mode. INT mode is a mode in which integration of the image sensor 13 is carried out When MD1="H" and MD2="H", the mode selector 23 renders only DD1 signal to be in a logical high level state and selects DD1 mode. DD1 mode is a mode in which the read out of the image sensor 13 is started and also in which sampling and holding of dark reference picture elements as will be described are carried out by NB1 and NB2 signals. When MD1="H" and MD2="L", the mode selector 23 renders only DD2 signal to be in a logical high level state and selects DD2 mode. DD2 mode is a mode in which the reading from the image sensor 13 is carried out and the output read from the image sensor 13 which has been processed is supplied to an analog-to-digital converting unit 15 of the microcomputer 14. The operation and function of each of those four modes will be described later.

The frequency divider 19 referred to above is operable to divide the frequency of reference clocks CP generated from a clock generator 18 of the microcomputer 14 to provide clocks $\phi o$ which are basis of transfer clocks $\phi 1$ and $\phi 2$ of the image sensor 13 and also to provide a timing clock $\phi$ necessary to synchronize with the clock $\phi o$ in both of the integrating time controller 20 and the signal processing timing generator 21. The clock $\phi o$ is supplied to the transfer clock generator 30 in which in cooperation with SH signal, RGICG signal supplied from the integrating time controller 20 and the clock $\phi$, clocks $\phi 1$ and $\phi 2$ are prepared to provide the transfer clocks for the image sensor 13. The integrating time controller 20 generates, during one of INI and INT modes, AGCRS signal, BG signal, SH signal and RGICG signals in synchronism with the clock $\phi$ supplied from the frequency divider 19, on the basis of the timing signal NB1 and NB2 supplied from the microcomputer 14, thereby to start the integration. The various signals referred to above are in turn supplied to various portions of the image sensor 13 shown in FIG. 1. In response to an integration completion signal VFLG from a brightness determining circuit 24 which is changed from "L" to "H" when the integration of the image sensor 13 is proper, or to the timing signals NB1 and NB2 which are transmitted from the mode selector 23 when DD1 signal is "H", the integrating time Controller 20 generates a BG signal and performs a terminating operation of the integration. Further, when DD1 signal is "H", and in response to the timing signals NB1 and NB2, the integrating time controller 20 generates SH signal and performs a starting operation for the reading of an output from the accumulator ST. At this time, signals necessary to obtain brightness information as will be described later, SH signal and $\phi a$, $\phi b$, $\phi c$ and $\phi d$ signals are transmitted to the brightness determining circuit 24. The brightness determining circuit 24 serves to monitor the amount of light radiated to the image sensor 13 in reference to AGCOS and DOS signals supplied from the image sensor 13 and has a function of reversing VFLG signal in the event that the integration is determined as having reached a proper level, and also a function of outputting G1 and G3 signals for changing the gain of the image sensor 13 according to the level of integration determined when the integration under a low brightness condition has terminated prior to the reversion of VFLG signal.

An AGC differential amplifier 25 is a circuit for amplifying an output signal OS supplied from the image sensor 13. The AGC differential amplifier 25 samples and holds, in response to a RSS/H signal sent from the signal processing timing generator, the potential of the OS signal immediately after the capacitor 8-1 has been charged through the field effect transistor 8-3 which is turned on by an OSRS signal. Thereafter, a difference between this charged potential of the OS signal and the potential of the OS signal which is lowered by the charge generated in each picture element is calculated, and the calculated difference is amplified to be sent to an OB subtracting AGC differential amplifier 26 as a signal Vos'. The gain of this OB subtracting AGC differential amplifier 26 at the time of amplification can be switched over by G3 signal outputted from the brightness determining circuit 24. In the OB subtracting AGC amplifier 26, a differential amplification between an output from a dark reference picture element and an output from an effective picture element, that is, a normal picture element having no aluminum light shielding film and the sampling and holding of an output Vos' are performed. Since the photo-diodes PD are accompanied by a dark output at all times, the picture element of the photodiode PD which is provided with the light shielding aluminum film is taken as a dark reference picture element whereas, as the reference picture element of the dark output, the value obtained by subtracting the output of the dark reference picture element from the output of the normal picture element is rendered to be an output from the image sensor 13. Since the output Vos' from the AGC differential amplifier 25 is repeatedly inputted to the OB subtracting AGC amplifier 26 in synchronism with the transfer clock, the level of the signal output Vos' of the effective picture element is sampled and held by OSS/H signal supplied from the signal processing timing generator 21, and, also, the output Vos' is sampled and held as the dark reference picture element output by OBS/H signal supplied from the signal processing timing generator 21. The OB subtracting AGC amplifier 26 serves to subtract the level Vos' of the dark reference picture element output which has been sampled and held from the level Vos' of the signal output of the effective picture element which has been sampled and held, and also to output, after having been multiplied by a gain which is switchable by G3 signal outputted from the brightness determining circuit 24, as the signal Vos to a lower side below an analog reference voltage Vref.

Figure 13:
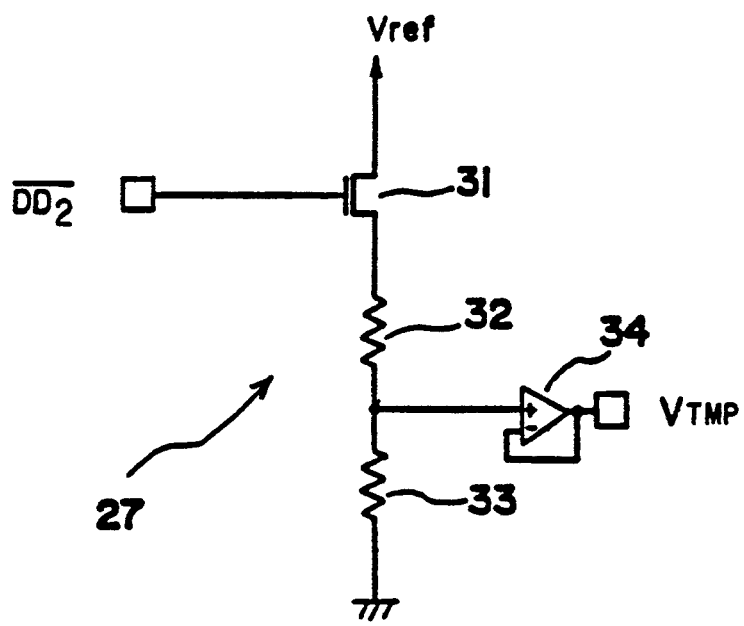
FIG. 13 is a circuit diagram of a temperature detector.

A temperature detector 27 detects the temperature by means of a resistance dividing circuit 27 shown in FIG. 13. As shown in FIG. 13, the resistance dividing circuit comprises a diffusion resistor 32 formed by diffusion and a resistor 33 formed of polysilicon (Poly-Si), both of which are so designed as to exhibit an equal resistance at normal temperature. Since the resistors 32 and 33 has different temperature coefficients, an output VTMP outputted from the junction therebetween through an buffer 34 corresponds to the temperature with Vref/2 taken as a center. An analog switch 31 will become off when $\overline{DD2}$="L" during DD2 mode and, therefore, by switching the analog switch 31 off, the consumption of an electric current is minimized. On the other hand, the analog switch 28 shown in FIG. 2 will be switched on during DD2 mode, that is, DD2="H", and conversely, the analog switch 29 is switched on when DD2="L". Therefore, during DD2 mode, the signal Vos is outputted as an output Vout and the signal VTMP is outputted as the output Vout during the other modes than DD2 mode. The signal Vout is inputted to the analog-to-digital converter 15 of the microcomputer 14 in which the analog-to-digital conversion on a lower voltage side than the analog reference voltage Vref is initiated by ADT signal to provide a digital data.

Thus, by switching the analog switches 28 and 29, in the event that the OB subtracting AGC differential amplifier 26 generates the output Vos corresponding to the used picture element, the signal thereof is inputted to the analog-to-digital converter 15 and, on the other hand, in the case other than that, a voltage VTMP of a predetermined range outputted from the temperature detector 27 is inputted to the analog-to-digital converter 15. Therefore, even though a negative output is produced by the OB subtracting AGC differential amplifier 26 as a result of subtraction of the output corresponding to the dark reference picture element from the output corresponding to the non-use picture element, and/or even though a negative output is produced as a result of subtraction of the output of the dark reference picture element from the output of the used picture element after the completion of the reading of the picture element, they are not be inputted to the analog-to-digital converter 15 and the temperature VTMP of the predetermined range is inputted from the temperature detector 27 to the analog-to-digital converter 15. Accordingly, the analog-to-digital converter 15 does not exceed an input dynamic range and will not rapture.

The foregoing is a full description of the hardware and, hereinafter, the operation at each of the modes of the image sensor 13 will be described in details.

The initializing mode will first be discussed. When the microcomputer 14 outputs MD1="L" and MD2="L", the mode selector 23 renders only INI signal to be "H" and informs the integrating time controller 20 of the initializing mode (INI mode). INI mode is a mode in which unnecessary charge of the image sensor 13 are drained immediately after the image sensor has been electrically powered. Immediately after the image sensor 13 has been electrically powered, since unnecessary charges are built up in the photo-diodes PD, the accumulators ST, the transfer registers RG, all of which are potential wells, therefore, it is necessary to bring the image sensor 13 in a position ready to operate by quickly draining those unnecessary charges. INI mode is provided for facilitating the drainage of the unnecessary charges while the potential structure of the image sensor 13 is so selected as shown in FIG. 3.

Figure 4:
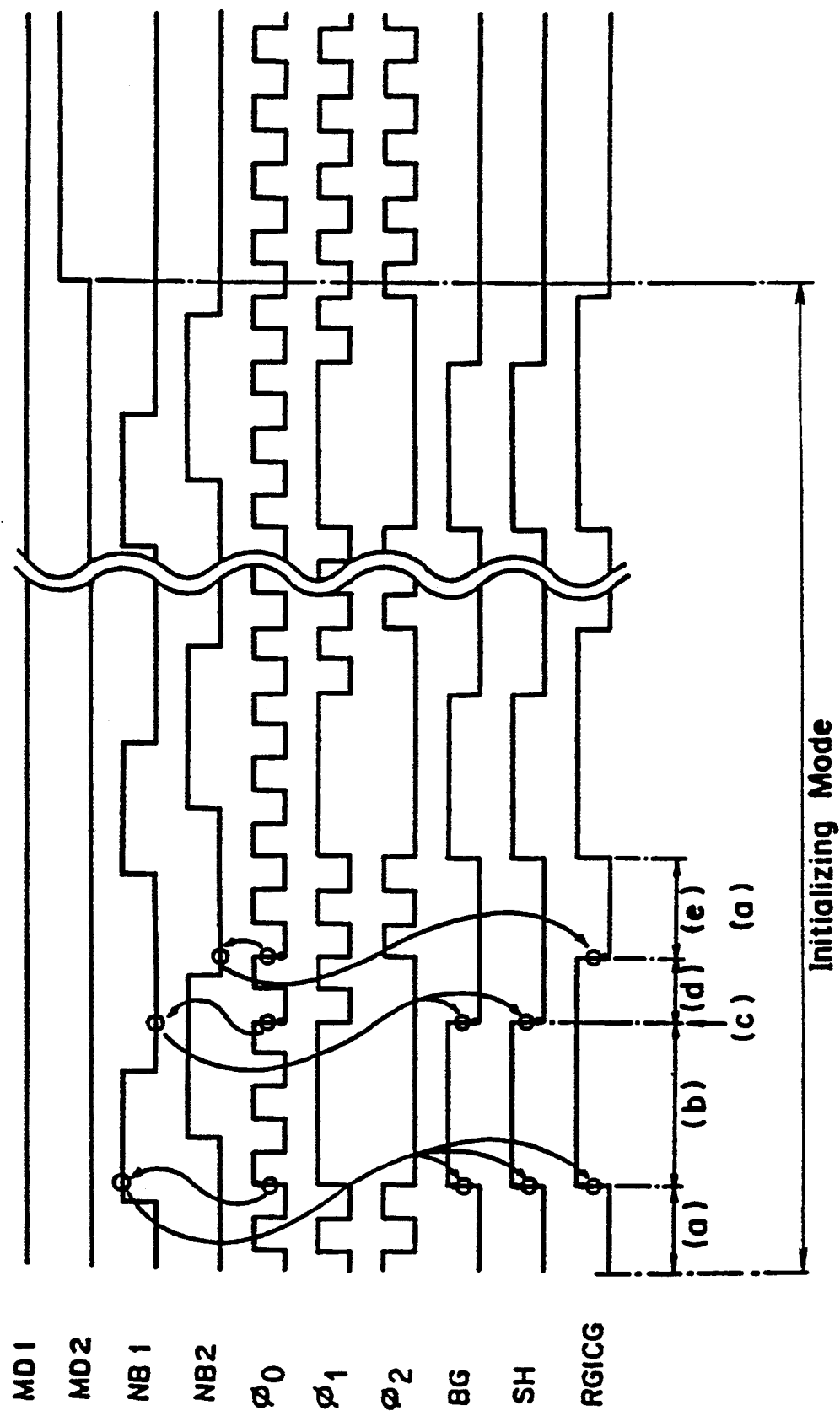
FIG. 4 is a timing chart showing various signals during an initializing mode in the first embodiment of the present invention.

Reference will now be made to FIG. 3 showing the potential structure and also to FIG. 4 showing a timing chart. In FIG. 3(a), from left to right, there is shown the overflow drain OD2, the overflow gate OG, the photo-diode PD, the barrier gate BG, the accumulator ST, the shift gate SH, the transfer register RG, the integrating clear gate RGICG and the overflow drain OD1. When a voltage is applied to each of the barrier gate BG, the transfer gate SH, the integrating clear gate RGICG and the transfer register RG ($\phi$1 being applied to the transfer register RG), the potential is so designed as to establish the relationship of PD>BG>ST>SH>RG>RGICG>OD1 as shown in FIG. 3(b) and the unnecessary charges in the photo-diode PD, the accumulator ST and the transfer register RG are at this time drained to the overflow drain OD1. This operation will now be described with reference to the timing chart.

The condition shown in FIG. 4(a) corresponds to FIG. 3(a). At this time, since NB1="L" and NB2="L" and no voltage is applied to each gate of the barrier gate BG, the shift gate SH and the integrating clear gate RGICG and unnecessary charges are accumulated in each of the photodiode PD, the accumulator ST and the transfer register RG. Where both of NB1 and NB2 are "L", the integrating time controller 20 for controlling the image sensor 13 does nothing to the image sensor 13.

When the microcomputer 14 generates NB1="H" and NB2="L" the integrating time controller 20, in synchronism with the clock $\phi$o supplied from the frequency divider 19, outputs SH="H", BG="H" and RGICG="H" to the image sensor 13 as shown in FIG. 4(b). SH and RGICG signals are also transmitted to the transfer clock generator 30 and, in the transfer clock generator 30, an OR output between SH signal and the clock $\phi$1 is rendered to be the transfer clock $\phi$1 and an NOR output between RGICG signal and $\phi$o is rendered to be the transfer clock $\phi$2 so that, when SH="H" and RGICG ="H", the supply of the transfer clock to the image sensor 13 can be interrupted under a condition of $\phi$1="H" and $\phi$2="L". The image sensor 13 when receiving SH, BG, RGICG, $\phi$1 and $\phi$2 signals drains the unnecessary charge from each of the photo-diode PD, the accumulator ST and the transfer register RG as shown in FIG. 3(b).

After the microcomputer 14 has outputted NB1="H" and NB2="H", it outputs NB1="L" and NB2="H". In response thereto, the integrating time controller 20, in synchronism with the clock $\phi$o, returns SH and BG signals back to "L" as shown in FIGS. 3(c) and 4(c). On the other hand, in the transfer clock generator 30, the transfer clock $\phi$1 starts its movement and the transfer clock $\phi$2 remains in "L" because of SH signal returning to "L". At this time, the potential difference between the transfer register RG and the overflow drain OD1 becomes large and the drainage of the unnecessary charge of the transfer register RG is accelerated and the unnecessary charge are completely drained to the overflow drain OD1 as shown in FIGS. 3(d) and 4(d). Also, at this time, since the transfer clock $\phi$2 remains stopped at "L" the unnecessary charge of the register RG will not flow into a different transfer register RG which adjoins such transfer register RG and to which the transfer clock $\phi$2 is applied.

After the passage of a predetermined time period is detected by a timer, the microcomputer 14 returns both of NB1 and NB2 to "L". The integrating time controller 20 renders RGICG signal to be "L" in synchronism therewith. Then, the voltage applied to RGICG terminal of the image sensor 13 becomes zero and the integrating clear gate RGICG is closed. Simultaneously therewith, in response to RGICG signal rendered to be "L", the transfer clock generator 30 produces the transfer clock $\phi'$ as shown in FIGS. 3(e) and 4(e), thereby completing one cycle of drainage of the unnecessary charge.

Generally, when the image sensor 13 is initialized, the cycle of drainage of the unnecessary charge is carried out several times before the initializing mode terminates. In the present invention, however, since the integrating clear gate RGICG is connected to each of the registers RG, the drainage of the unnecessary charge from each register RG need not be carried out by the transfer from the register RG and, therefore, the time required for one cycle of drainage of the unnecessary charge can be shortened and, consequently, the time allocated to the initializing mode can be reduced.

The second mode, that is, the integrating mode, will now be described.

When the microcomputer 14 outputs MD1="L" and MD2="H" the mode selector 23 renders only INT signal to be "H", informing the integrating time controller 20 of the integrating mode (INT mode). During INT mode, operations for starting the integration of the image sensor 13 and terminating the integration at the time of a high brightness are carried out.

Figure 5A:
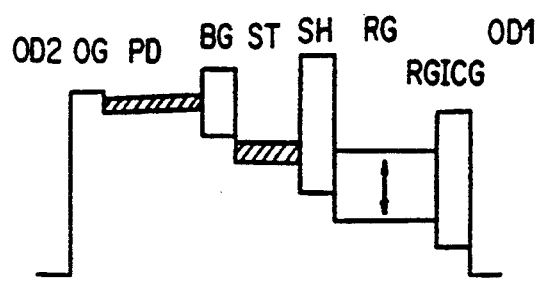
FIGS. 5a–5g illustrate diagrams of potential structures of the image sensor during an integrating mode.
Figure 5E:
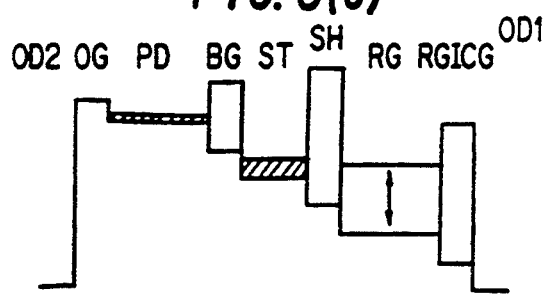
Figure 5B:
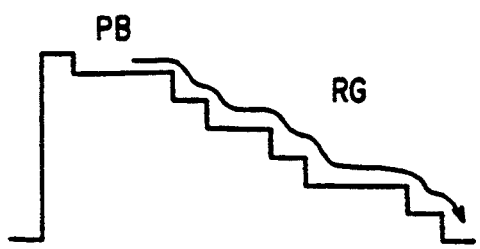
Figure 5F:
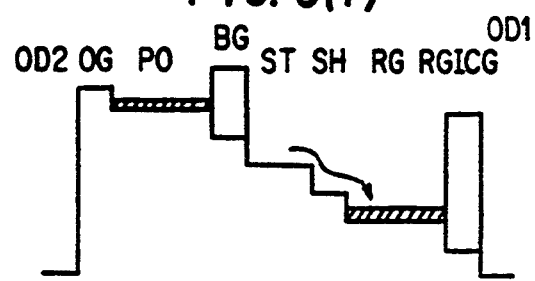

These operations will now be described with reference to FIGS. 5 and 6. The integration starting operation is substantially identical with the operation for draining the unnecessary charge during the initialization except for BG signal. BG signal is set up to "H" in synchronism with $\phi$o (In the figures, $\phi$o is a set-up timing.) by the integrating time controller 20 after the microcomputer 14 has outputted NB1="H" and NB2="L". This is identical with that during INI mode. However, where the microcomputer 14 outputs NB1="L" and NB2="H", BG signal remains to be "H" during INT mode although BG signal is returned to "L" in synchronism with $\phi$o during INI mode. BG signal will be rendered to be "L" at the time of termination of the integration as will be described later.

Figure 5C:
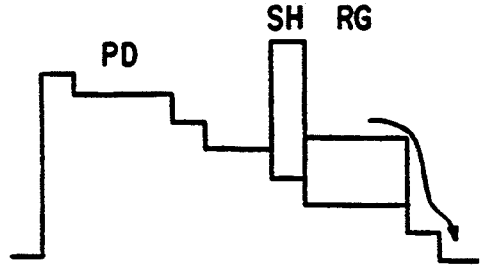
Figure 5G:
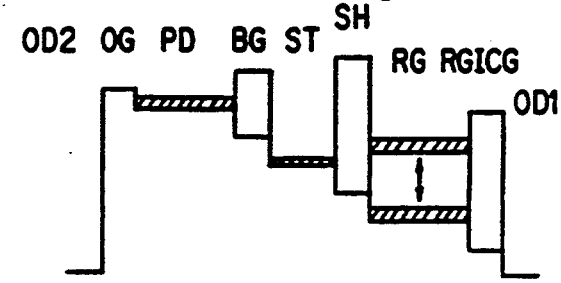
Figure 5D:
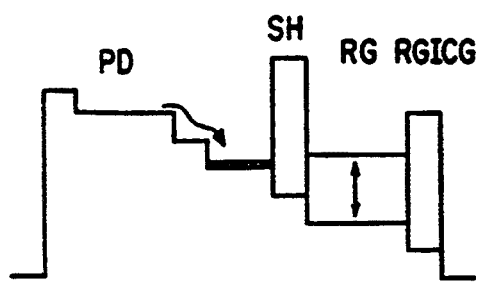
Figure 6:
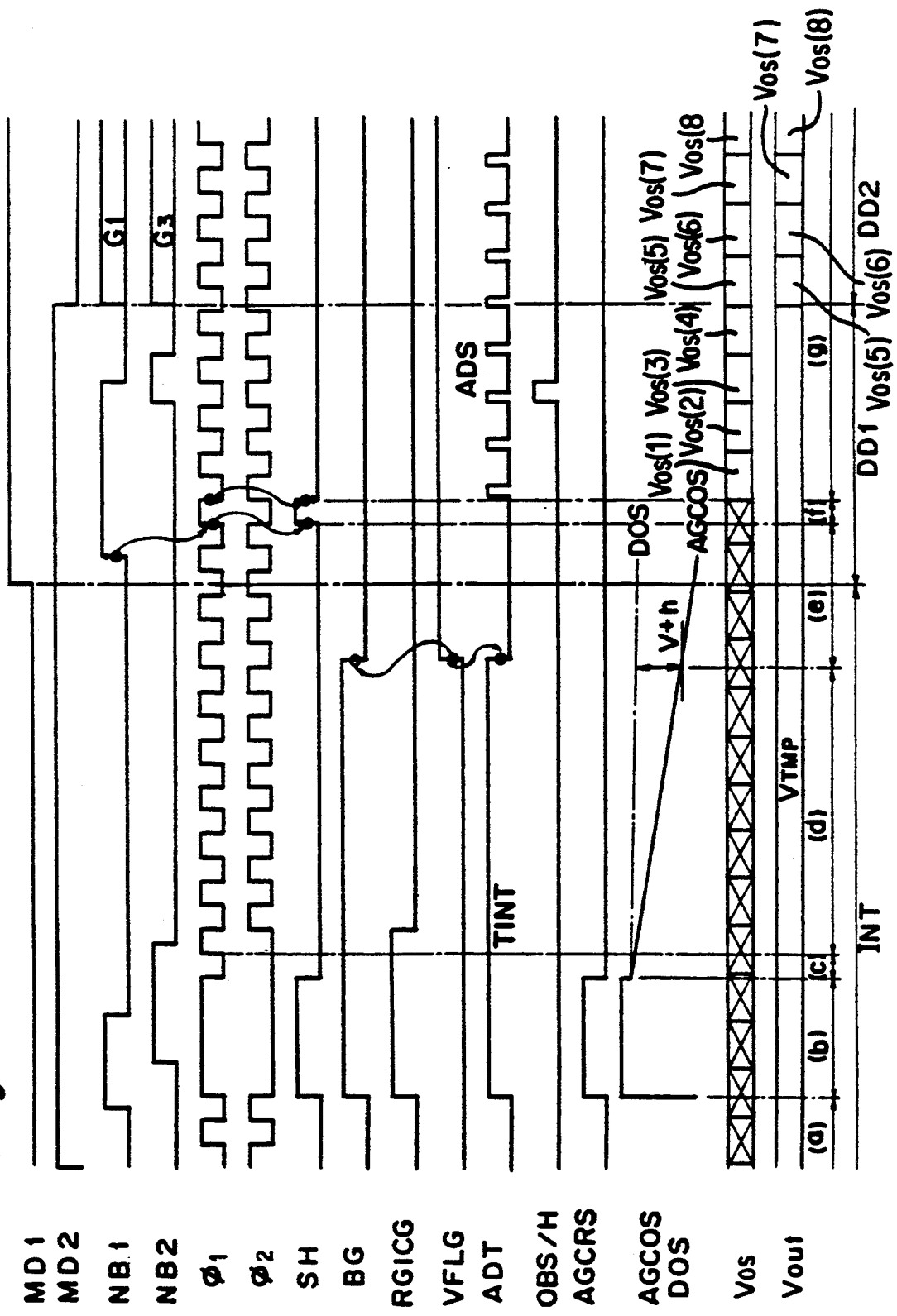
FIG. 6 is a timing chart showing various signals during the integrating mode.

When the gate voltage of the shift gate SH becomes zero at such a timing as shown in FIGS. 5(c) and 6(c), the shift gates SH restore to higher potentials than the photodiodes PD, the accumulators ST and the overflow gates OG and, from this timing, the charge generated in the photodiodes PD flow into the accumulator ST and are accumulated in the respective accumulators ST while the integration is initiated in the image sensor 13.

On the other hand, the time of termination of the integration is determined by an output from the brightness monitoring photo-diode 9. Hereinafter, the operation of the brightness determining circuit 24 will be discussed, followed by the discussion of the time of termination of the integration.

The integrating time controller 20 outputs AGCRS signal to the image sensor 13 at the same timing as SH signal at the start of the integration. As shown in FIG. 1, AGCRS signal is applied to the gate of the field effect transistor 10-3 connected with the capacitor 10-1 connected with the brightness monitoring photo-diode 9 and also to the gate of the field effect transistor 12-3 connected with the capacitor 12-1 connected with the compensator diode 11. By the application of AGCRS signal, the capacitors 10-1 and 12-1 are charged to about the power source voltage VDD. When AGCRS signal is rendered to be "L" at the same timing as SH signal, the supply of an electric power is interrupted and, thereafter, the brightness monitoring photo-diode 9 generates a charge proportional to the amount of radiated light and the potential of the capacitor 10-1 starts lowering in proportion to the charge so generated. On the other hand, the compensator diode 11 generates a charge due to its dark output and the potential of the capacitor 12-1 connected therewith starts lowering in proportion to the charge so generated. The individual potentials are outputted to an analog circuit, shown in FIG. 8, of the brightness determining circuit 24 shown in FIG. 2. Referring to FIG. 8, AGCOS signal is inputted to a positive input of an operational amplifier 43 whereas DOS signal is inputted to a negative input of the operational amplifier 43. This operational amplifier 43 generates a signal indicative of the difference between the inputs. The output $V_{43}$ of the operational amplifier 43 can be expressed by the following equation.

$$V_{43} = Vref - (DOS - AGCOS)$$

This output $V_{43}$ is inputted to a negative input of a comparator 45 which is one of the brightness determining means. On the other hand, a positive input of the comparator 45 is supplied with a constant voltage generated by a resistance division accomplished by field effect transistors 46, 47, 48 and 49 in a reference voltage generator RVC. During the integration, only $\phi$d is rendered to be "H" to only turn on the field effect transistor 49, and the constant voltage supplied to the positive input of the comparator 45 is $V_{49} = (Vref - Vth)$. The output of the comparator 45 will become "H" when $V_{43} < V_{49}$. In other words, when the following relationship establish, the output of the comparator 45 becomes "H".

$$Vref - (DOS - AGCOS) < Vref - Vth$$

$$DOS - AGCOS > Vth$$

(DOS−AGCOS) is indicative of a voltage lowered by the radiation of light on the brightness monitoring photo-diode 9 (a dark output component is compensated for by an output from the compensator diode 11). Immediately after the initiation of the integration, the amount of light radiated on the brightness monitoring photo-diode 9 is of shortage and DOS−AGCOS≈0, and therefore, the output VFLG of the comparator 45 is "L". At the timing that (DOS−AGCOS) becomes higher than the voltage Vth during the integration, the integration of the image sensor becomes proper and the output VFLG of the comparator 45 reverses from "L" to "H". As shown in the timing chart of FIG. 6, the integrating time controller 20 renders BG signal to be "L" when the output VFLG of the comparator 45 reverses. When BG signal becomes "L", as shown in FIG. 5(e), the potential of the barrier gate BG becomes higher than the potential of the photo-diode PD to avoid the flow of the charge generated in the photo-diode PD into the accumulator ST, and the charge accumulated in the accumulator ST is, at the time VFLG signal becomes "H", that is, BG signal becomes "L", retained with the integration consequently terminated. The charge generated subsequent to the termination of the integration is accumulated in the photo-diode PD and will not flow into the accumulator ST since, even though the accumulation proceeds, as shown in FIG. 5(e), the charge flows over the overflow gate OG, which is lower in potential than the barrier gate BG, and is then drained to the overflow drain OD2.

Also, the integrating time controller 20 renders BG signal to be "L" and, at the same time, TINT signal to be "L" to inform the microcomputer 14 through ADT terminal of the reversion of TINT signal. In this way, the integration starting operation during the integrating mode and the operation of terminating the integration during the high brightness condition are carried out.

Hereinafter, the third mode, that is, a data read-out mode 1 (DD1 mode) will be discussed.

When the microcomputer 14 outputs MD1="H" and MD2="H" the mode selector 23 renders only DD1 signal to be "H", informing the integrating time controller 20 of DD1 mode. DD1 mode is a mode in which the integration terminating operation is carried out during a low brightness condition and, also, a read-out starting operation for starting the read-out of data of each picture element of the image sensor 13 is carried out.

At the outset, the integration terminating operation during the low brightness condition will be described with reference to a timing chart shown in FIG. 22. Where an object is of a low brightness, there may be a case in which a relatively long time will be required before the brightness determining circuit 24 determines that a proper integrating time has passed. If the integration is carried out for a long time, the dark output will increase accompanied by reduction in S/N ratio. Also, because of the nature of a system, a very long integrating time is not desirable. By way of example, when used in a focus detecting apparatus of a photographic camera, there may arise such a problem that the cycle of focus detection will be prolonged and the focus detection cannot cope with the movement of the object. Because of this, a maximum permissible integrating time is preset in the microcomputer 14 so that, in the event that TINT signal outputted to ADT terminal is not reversed even though the preset maximum permissible integrating time has passed, the microcomputer 14 can output MD1="H" and MD2="H" to assume DD1 mode whereby the integration terminating operation is carried during DD1 mode. When the integrating time controller 20 receives from the microcomputer 14 respective signals of NB1="H" and NB2="L" during DD1 mode, the integrating time controller 20 immediately renders BG signal to be "L". In this way, as is the case with the foregoing, the potential of the barrier gate BG shown in FIG. I becomes higher than the photo-diode PD and the flow of the charge generated in the photo-diode PD into the accumulator ST is interrupted with the integration terminated consequently. See FIG. 22.

The operation for starting the read-out of the data of each picture element of the image sensor 13 will now be described. Regardless of the low brightness condition or the high brightness condition, when the microcomputer 14 outputs NB1="H" and NB2="L" during DD1 mode, the integrating time controller 20 generates SH signal pulse at the timing when the transfer clock $\phi o$ is "H", in synchronism with the transfer clock $\phi o$ (See FIG. 6 or FIG. 22). Thereby, as shown in FIGS. 5(f) and (g), pulse voltage is applied to the shift gate SH of the image sensor 13 so that a signal charge of each picture element accumulated in the associated accumulator ST is transferred onto the transfer register RG. Thereafter, by the action of the transfer clocks $\phi 1$ and $\phi 2$, the signal charge of each picture element is transferred and read out. Although the transfer of the signal charge accumulated in the associated accumulator ST to the transfer register RG is carried out when the microcomputer 14 outputs NB1="H" and NB2="L" during DD1 mode, the transfer register RG must have necessarily been restored from a non-standing condition which occurs after the start of the integration and assumed a standing condition. During the standing condition, a dark charge is accumulated in each transfer register RG as shown in FIG. 23. This dark charge is equal to the sum of a dark charge generated in a potential well of each transfer register RG and a dark charge of the preceding register to which it is sequentially transferred. At the start of the integration, a voltage is applied to a gate terminal of the integration clear gate RGICG, the integration clear gate RGICG between the transfer register RG and the overflow drain OD1 is switched on, and the dark charge of the transfer register RG is all cleared. After the integration clear gate RGICG has been switched off, and each time one cycle of transfer clock $\phi 1$ has been passed, the dark charge in the transfer register RG is brought in the standing condition from the left-hand side of FIG. 23. By the time all of the transfer register RG resume the standing condition, a time equal to the number of the picture elements multiplied by the cycle time of the transfer clocks is required.

In the event that SH pulse is generated under the non-standing condition, some of the dark charge components of the transfer register RG included in the charges which are extracted as an output may be in the non-standing condition and, therefore, a proper signal cannot be extracted. Because of this, the timing at which SH pulse is generates should be at least after RGICG signal has been reversed from "H" to "L" and also after the time equal to the number of the picture elements multiplied by the cycle time of the transfer clocks ($N \times T$) has been passed.

Although it often occurs that under the high brightness condition the integration is completed within one cycle ($N \times T$), it is possible to delay the generation of SH pulse by the time one cycle ($N \times T$) has been passed because the integration can be terminated by closing the barrier gate BG.

The processing of the picture element output read out will be hereinafter described with reference to FIGS. 11 and 12.

The signal charge of each picture element of the image sensor 13 is transferred to the capacitor 8-1 shown in FIG. 1 at timings of $\phi 1$="L" and $\phi 2$="H". A signal processing timing generator 21 generates OSRS signal pulse at the timing of $\phi 1$="H" and $\phi 2$="L" as shown in FIG. 12, prior to the transfer of the signal charge, which pulse is subsequently applied to the gate of the field effect transistor 8-3 as shown in FIG. 1, thereby causing the capacitor 8-1 to be charged to about the power source voltage and then to be reset. In the event that the transfer of the signal charge is carried out when $\phi 1$="L" and $\phi 2$="H", the voltage of the capacitor 8-1 is lowered by the signal charge and the output OS of the image sensor 13 is outputted as shown in FIG. 12. In AGC differential amplifier 25, in response to RSS/H signal supplied from the signal processing timing generator 21, the voltage level at the time of resetting is stored by a sample-hold circuit composed of a field effect transistor 52, a capacitor 53 and a buffer 51 as shown in FIG. 11, and supplied to a positive input of an operational amplifier 54. On the other hand, OS signal is inputted to a negative input of the operational amplifier 54 through a buffer 50, and an output differentiated and amplified by a gain determined by G1 and G2 signals inputted to respective gates of the field effect transistors 55, 56, 57 and 58 is outputted from the operational amplifier 54 as an output Vos' (FIG. 12).

Hereinafter, the determination of the integrating level will be described.

Where the integration is forcibly terminated in the low brightness condition, the level of the picture 10 element output of the image sensor 13 is naturally lowered to a value lower than that which should have been. Therefore, in such case, the integrating level is detected by the use of the previously discussed brightness determining circuit 24 and, depending on a result of the detection, a gain is imposed on the output of the image sensor 13 to give an output of proper level at all times.

Hereinafter, description is made of a brightness determining analog circuit of FIG. 8, a pulse timing chart of FIG. 9, a brightness determining logic circuit of FIG. 10 and the logical table of FIG. 24. It is to be noted that the brightness determining analog circuit and the brightness determining logic circuit altogether constitute the brightness determining circuit 23 which has hereinabove described. As shown in FIG. 8, the operational amplifier 43 outputs the output $V_{43}=Vref-$(DOS−AGCOS) corresponding to the amount of incident light, which is in turn applied to the negative input of the comparator 45 which is one of the brightness determining means. At the time of determination of the integrating time, $\phi d$ is applied as shown in FIG. 9, the field effect transistor 49 of the reference voltage generator RVC is switched on, and (Vref−Vth) is inputted to the positive input of the comparator 45. Assuming that SH pulse is generated, all of latch circuits 1(73), 2(74) and 3(75) shown in FIG. 10 are reset. Subsequently, as shown in FIG. 9, when $\phi c$ pulse is generated, the field effect transistor 48 shown in FIG. 8 is switched on and (Vref−Vth/2) is inputted to the positive input of the comparator 45. If at this time $$(DOS-AGCOS) > Vth/2$$

the output VFLG of the comparator 45 becomes "H" and, consequently, an output from an AND gate 70 shown in FIG. 10 becomes "H", thereby setting the latch circuit 1(73). Thereafter, as shown in FIG. 9, when $\phi b$ pulse is generated, the field effect transistor 47 shown in FIG. 8 is switched on and (Vref−Vth/4) is inputted to the positive input of the comparator 45. If at this time $$(DOS-AGCOS) > Vth/4,$$

the output VFLG of the comparator 45 becomes "H" and, consequently, an output from an AND gate 71 shown in FIG. 10 becomes "H", thereby setting the latch circuit 2(74). Further, when $\phi a$ pulse is generated as shown in FIG. 9, a field effect transistor 46 shown in FIG. 8 is switched on and, consequently, (Vref−Vth/8) is inputted to the positive input of the comparator 45. If at this time $$(DOS-AGCOS) > Vth/8,$$

the output VFLG of the comparator 45 becomes "H" and, consequently, an output from an AND gate 72 becomes "H", thereby setting the latch circuit 3(75). In each of the cases, G1 and G3 signals are generated as shown in the following logical table of FIG. 24. Based on these signals, the gain is selected as shown in the logical table and, therefore, Vos of approximately proper levels can be obtained.

| Cases | Gain |
| --- | --- |
| (DOS − AGCOS) ≧ Vth/2 | ×8 |
| (DOS − AGCOS) ≧ Vth/4 | ×16 |
| (DOS − AGCOS) ≧ Vth/8 | ×32 |
| (DOS − AGCOS) < Vth/8 | ×64 |

Thus, by switching the field effect transistors 49, 48, 47 and 46 on sequentially, the reference voltage generator RVC generates a plurality of reference voltages and, therefore, the brightness can be determined in a plurality of stages with one comparator 45, making it possible to reduce the number of comparators to be formed on the same chip as the image sensor 13.

A field effect transistor 44 shown in FIG. 8 is a switch for providing an electric power to the resistance divider circuit, that is, the reference voltage generator RVC only during each of INT and DD1 modes. By this field effect transistor 44, the reference voltage generator RVC is powered only when the brightness determination is required, thereby saving the electric power consumption. This power consumption can be enhanced since the integrating time during the high brightness condition can be reduced as compared with the reading time.

As shown in FIG. 11, the signal Vos' is held by a sample-hold circuit composed of a field effect transistor 60, a capacitor 62 and a buffer 64 and is inputted to a negative input of an operational amplifier 65. The holding of this signal Vos' is carried out by OSS/H pulse signal which is generated at the timing of $\phi 1=$"L" and $\phi 2=$"H" from the signal processing timing generator 21. Also, the signal Vos' is also inputted to a sample-hold circuit composed of a field effect transistor 59, a capacitor 61 and a buffer 63. In this sample-hold circuit, the sampling and holding of an output of the dark reference picture element shielded from light by the aluminum film as shown in FIG. 1 is carried out. A pulse defining the timing of the sampling and holding is OBS/H signal shown in FIG. 12 which is generated in the following sequence.

Figure 12:
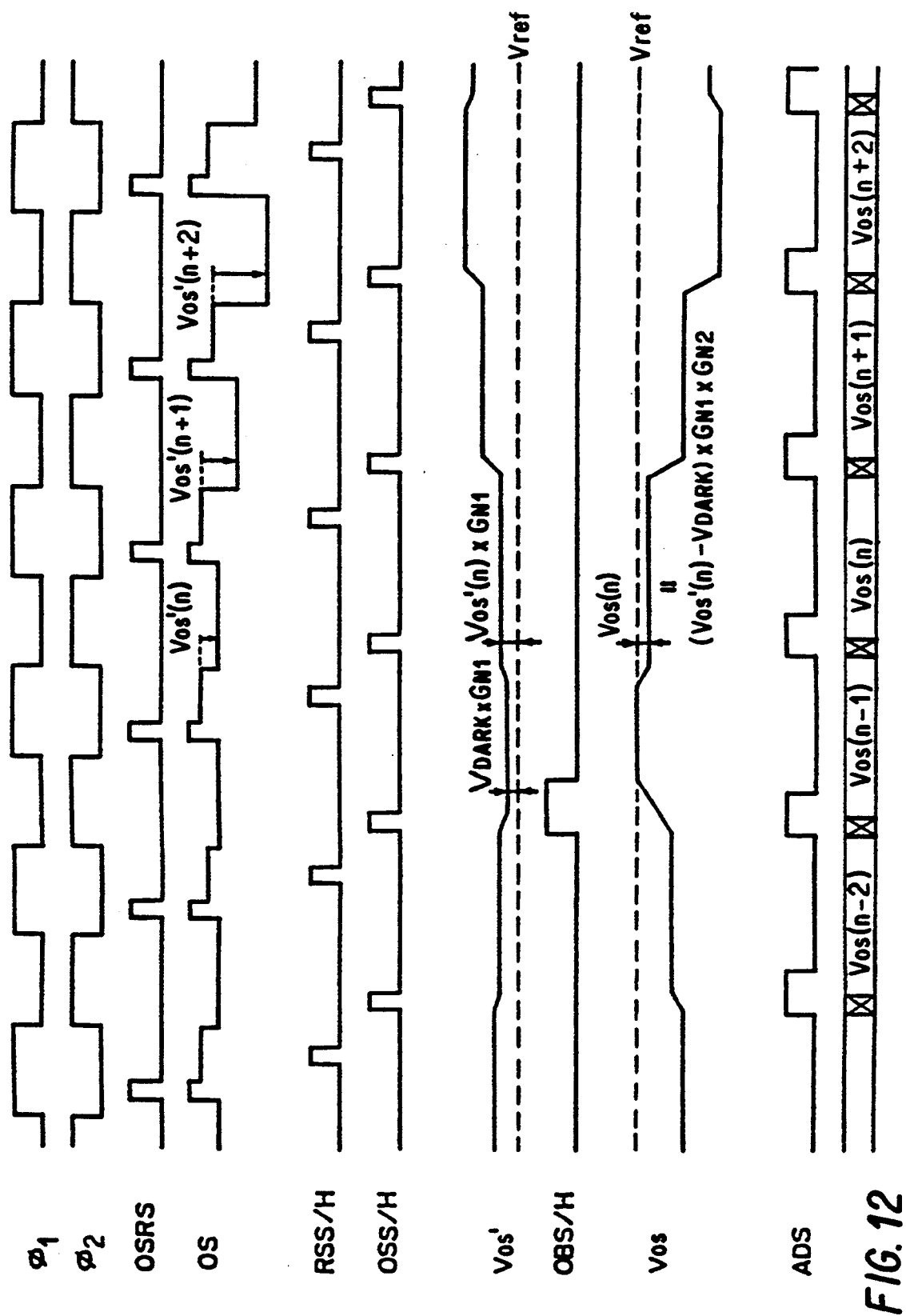
FIG. 12 is a timing chart associated with the processing of outputs from picture elements.

As shown in FIGS. 2 and 12, after the transit from INT mode to DD1 mode, ADS signal defining the timing of the analog-to-digital conversion appears in ADT signal. The microcomputer 14, monitoring this signal, counts the timing of the sampling and holding of the output of the dark reference picture element. The microcomputer 14 then outputs NB1="H" and NB2="H" during the outputting of the dark reference picture element, causing the signal processing timing generator 21 to render OBS/H signal to be "H". In this way, the sample-holding circuit composed of the field effect transistor 59, the capacitor 61 and the buffer 63 as shown in FIG. 11 holds the output of the dark reference picture element so inputted thereto and then supplies it to the negative input of the operational amplifier 2(65). After the sampling and holding of the output of the dark reference picture element, an output of the operational amplifier 2(65) is subtracted in a quantity corresponding to the output of the dark reference picture element which has been held, and is amplified at a gain determined by G3 and G4 signals connected to the respective gates of field effect transistors 66 to 69 thereby as shown in FIG. 11(b) to output as the signal Vos (See FIG. 12).

As hereinbefore described, the output signal OS from the image sensor 13 is sampled twice at the AGC differential amplifier 25 and OB subtracting AGC differential amplifier 26 with the reset level subtracted from the signal level thereof, the signal free from reset noises can be obtained, and further, the dark reference level is subtracted from the signal free from the reset noises so that the output Vos which is the output of each picture element from which the dark output is removed can be obtained. Furthermore, this output Vos is formulated as multiplied by a gain of ×8 to ×64 depending on the average level of the outputs of the picture elements, as will be described later, in the AGC differential amplifier 25 and the OB subtracting AGC differential amplifier 26 relative to the output OS of the image sensor 13. Thus, since two stage amplification is effected by means of two amplifiers, that is, the amplifiers 25 and 26, the range of resistances connected with the operational amplifiers 54 and 65 may be narrow as compared with the amplification with the use of one amplifier and, therefore, the space occupied by resistors can be minimized.

Hereinafter, the gain of the operational amplifier 54 of AGC differential amplifier 25 and that of the operational amplifier 65 of OB subtracting AGC differential amplifier 26 will be discussed. In the illustrated embodiment, in order to switch the gain over to one of ×8, ×16, ×32 and ×64 relative to the output OS of the image sensor 13, arrangement has been made that the gain can be switched in two stage in each of the operational amplifiers 1(54) and 2(65). In this case, the operational amplifiers 54 and 65 have a problem associated with offset. Where the gain is applied in two stages, the output can be expressed by the following equation if the first and second stage gains are expressed by GN1 and GN2, respectively, the offset of each of the operational amplifiers is expressed by $\Delta V$, the input is expressed by Vi and the output is expressed by Vo.

$$Vo = \{(Vi + \Delta V) \times GN1 + \Delta V\} \times GN2$$
$$= Vi \times GN1 \times GN2 + \Delta V \cdot (GN1 \times GN2 + GN2)$$
$$= (Vi + \Delta V) \times GN1 \times GN2 + \Delta V \times GN2$$

Where the total gain GN1×GN2 of the two-stage operational amplifiers does not vary, an offset is caused by GN2 to appear in the second term ($\Delta V \times GN2$) of the above equation. In other words, if GN2 is chosen to be small, the offset of the total can be minimized.

Accordingly, by selecting the gain GN1 of the first stage to be higher than the gain GN2 of the subsequent stage, the offset can be suppressed, however, this means leaves the offset. Because of this, the operational amplifier 2(65) in the subsequent stage is susceptible to a level shift relative to the voltage which has been lowered in a quantity corresponding to the potential of one diode 99, which is a biasing means, from the reference voltage Vref and, therefore, arrangement has been made that, in order to make it possible to effect the analog-to-digital conversion at all times, the offset can appear on one side of lower voltage than the reference voltage Vref.

To OB subtracting AGC differential amplifier 26 is applied a signal indicative of a second dark reference picture element, which has been applied with the aluminum light shielding film, prior to the outputting of a signal indicative of the effective picture elements and after the signal indicative of the dark reference picture element has been sampled and held. Since the previously held dark reference picture element is subtracted from the output indicative of the second dark reference picture element, the output equal to the reference voltage Vref can be obtained unless the operational amplifier is free from the offset. However, since the output of the operational amplifier 2(65) tends to offset towards the side of lower voltage than the reference voltage Vref, the output will be (Vref−Voffset). When this is subjected to the analog-to-digital conversion, a signal corresponding to Voffset can be obtained as digital data. Henceforth, the amount corresponding to Voffset is subtracted from outputs of the effective picture elements by the calculation of the microcomputer 14 and, therefore, data inputted to the microcomputer 14 are substantially identical with data from which offset components have been removed.

Hereinafter, DD2 mode will be described.

During DD2 mode, no active operation is effected to the image sensor 13. Because of this, inputting and outputting of NB1 and NB2 signals connected with I/O buffer 22 are switched so that G1 and G3 signals can be outputted to NB1 and NB2, respectively, thereby to inform the microcomputer 14 of gain information of outputs from the image sensor 13. This switching is carried out by DD2 signal.

The signal which is outputted as Vout only during DD2 mode is an output Vos of the image sensor 13.

The picture elements used in the system are those of the image sensor 13 which are detected in two separate regions, and no photo-diode is provided between these two separate regions. Since a problem accompanies in the outputting of outputs of those picture elements as Vout to the analog-to-digital converter 15, the switching between DD2 mode and DD1 mode is carried out so that, only at the time of outputting of the effective picture elements, Vos is outputted as Yout. The output Vos' of the AGC differential amplifier 25 can be expressed as a sum of an output component Vos'(sig) corresponding to the light signal and a dark output component Vos'(dark) at the time of outputting of the effective picture elements, that is, Vos'=Vos'(sig)-+Vos'(dark). A component corresponding to Vos'-(dark) is subtracted in OB subtracting AGC differential amplifier 26, and Vos expressed by the following equation is outputted to the analog-to-digital converter 15.

$$Vos = Vref - GN2 \times (Vos' - Vos'(\text{dark}))$$

At this time, since the output from the picture elements from which the photo-diodes are removed does neither contain the output corresponding to the light signal nor the dark output component, Vos' will be zero. When the subtraction of Vos'(dark) is carried out in OB subtracting AGC differential amplifier 26, the following relationship can establish.

$$Vos = Vref - GN2 \times (0 - Vos'(\text{dark})) > Vref$$

Thus, Vos tends to become a higher voltage than the reference voltage Vref, contrary to the lower voltage side than the reference voltage Vref which can be used for the analog-to-digital conversion, thereby exceeding the dynamic range of the analog-to-digital conversion to such an extent as to result in a possible destruction of the analog-to-digital converter 15. Because of this, other than the outputs from the effective picture elements, the analog switches 28 and 29 are changed over so that the temperature detected output VTMP capable of being subjected to the analog-to-digital conversion can be outputted. In this way, by causing vos to be outputted with DD2 rendered to be "H" only at the time of outputting from the effective picture elements, and also causing VTMP to be outputted with DD2 rendered to be "L" at the time of outputting from the invalid picture elements, the analog-to-digital conversion can be carried out within the dynamic range of the analog-to-digital converter 15.

The foregoing is the description of the first preferred embodiment of the present invention. Hereinafter, a second preferred embodiment of the present invention in which a modification is effected to a means for removing the dark output component described in connection with the foregoing embodiment will be described. However, for the sake of brevity, only differences by which the second preferred embodiment is differentiated from the first preferred embodiment will be described with particular reference to FIGS. 14 and 15.

Figure 14:
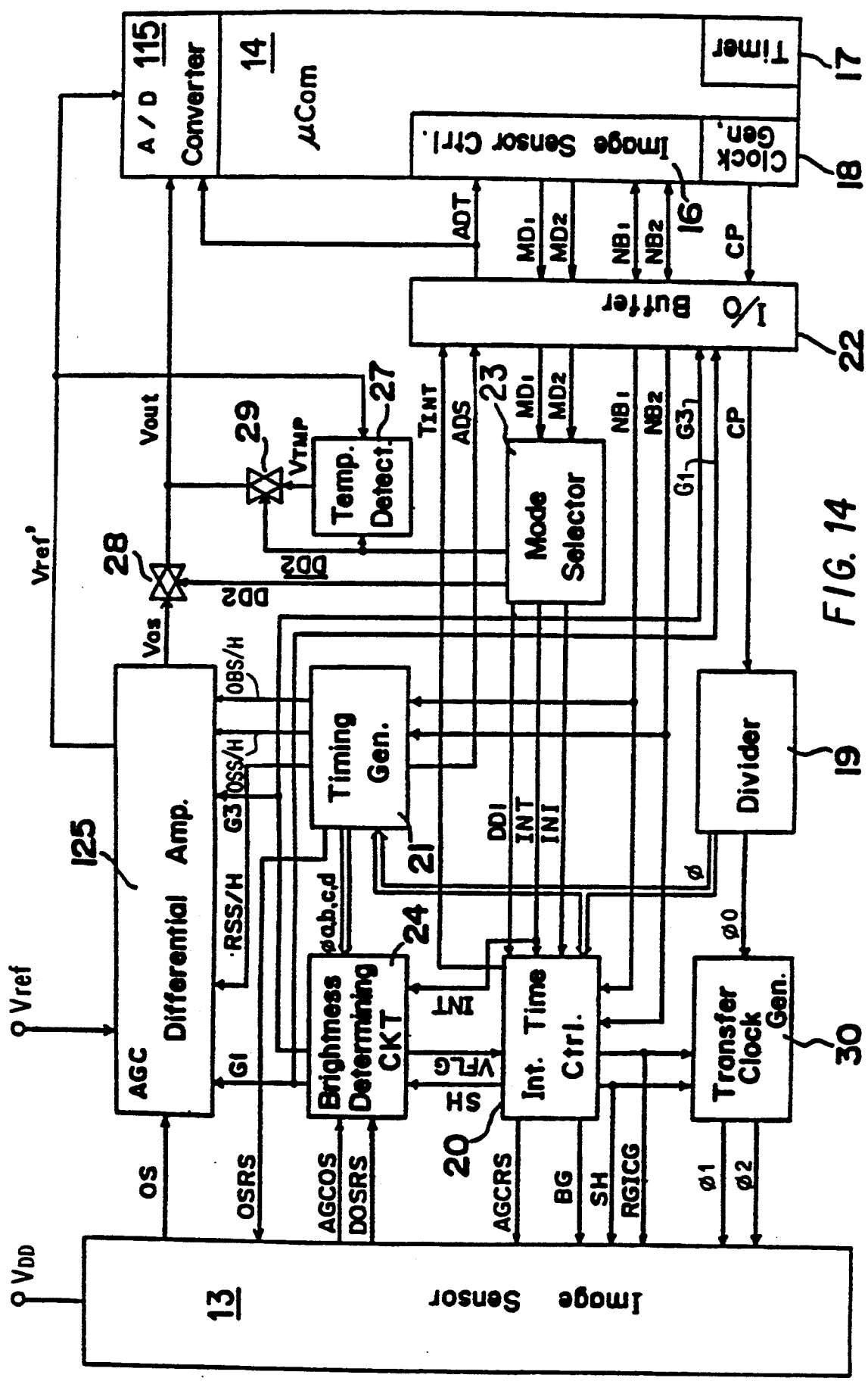
FIG. 14 is a block circuit diagram showing the solid-state imaging device according to a second preferred embodiment of the present invention.
Figure 15:
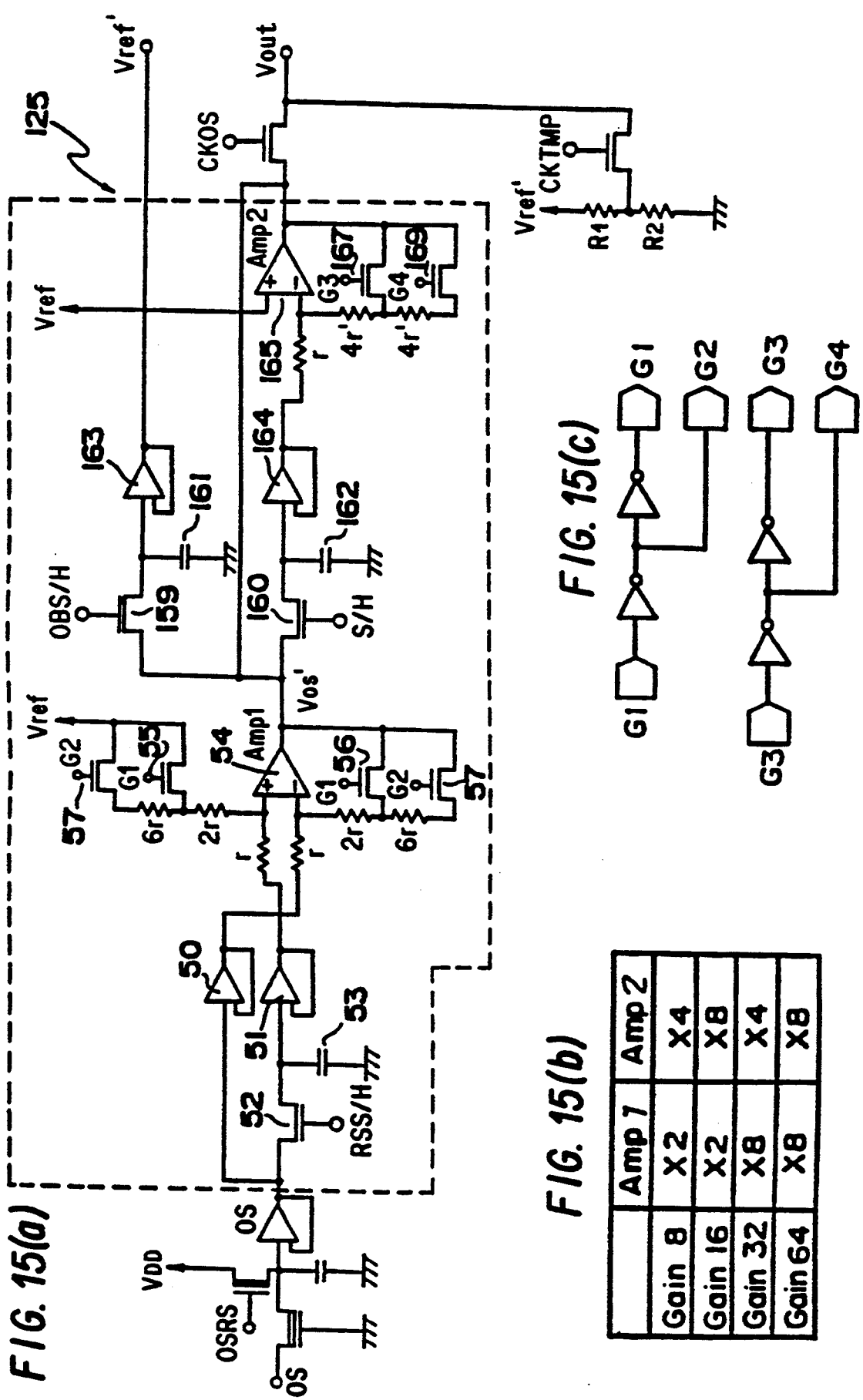
FIGS. 15a–15c are circuit diagrams of AGC operational amplifier used in the second embodiment of the present invention.

As can be indicated by the difference between the circuit block diagram of FIG. 14 showing the second embodiment of the present invention and the circuit block diagram of FIG. 2 showing the first embodiment of the present invention, the second preferred embodiment differs from the first embodiment in that the analog reference voltage Vref' is outputted from AGC differential amplifier 125. Also, in FIG. 14, OB subtracting AGC differential amplifier used in the first embodiment is not employed. The operation of the second embodiment of the present invention shown in FIG. 15 will now be described. As is the case with the first embodiment, prior to the outputting from the effective picture elements, the image sensor 13 outputs a dark output, that is, an output of the dark reference picture elements. In a sample-hold circuit which constitutes a retaining means composed of a field effect transistor 159, a capacitor 161 and a buffer 163 all used in the AGC differential amplifier 125, the output of the dark reference picture element is sampled and held by the timing of OBS/H pulse. While in the first preferred embodiment of the present invention the output which has been held has been described as connected to the negative input of the operational amplifier 65 so that the subtraction can be carried out in the operational amplifier, in the second preferred embodiment of the present invention, the output which has been held is outputted as Vref'. This Vref' is supplied to an analog-to-digital converter 115 as an analog reference voltage, and in the analog-to-digital converter 115 the voltage inputted is subjected to the analog-to-digital conversion with the analog reference voltage used as a reference. In other words, since the conversion is carried out to provide a digital value by taking a difference between the input Vout and the reference voltage Vref', it can be considered as an equivalent with the case in which the subtraction of the output from the dark reference picture element is carried out in the analog-to-digital converter 115. Accordingly, the problem associated with the offset of the operational amplifier which would occur when it is used as the reference voltage for the analog-to-digital converter by subtracting the output of the dark reference picture element from the output of the effective picture element and then shifting in level in the operational amplifier would not arise in the second embodiment of the present invention.

Also, both of the output from the dark reference picture element which is sampled and held in a sample-hold circuit composed of a field effect transistor 160, a capacitor 162 and a buffer 164 and the output from each effective picture element constitute the output from the operational amplifier 165 and, since the difference therebetween is taken in the analog-to-digital converter 115, the offset of the operational amplifier 165 can be completely removed. Accordingly, in the second embodiment of the present invention, the removal of the dark output of the image sensor 13 and the removal of the offset of the operational amplifier 165 are effected simultaneously.

Figure 18:
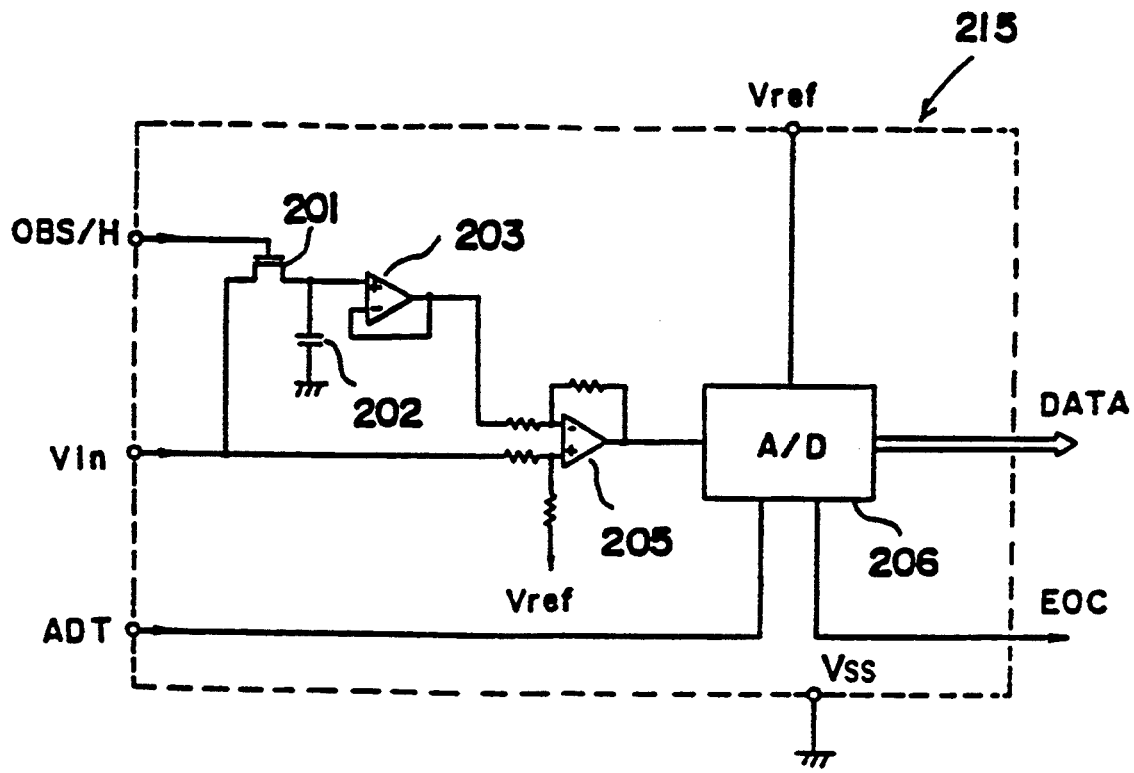
FIG. 18 is a circuit diagram of an analog-to-digital converter.
Figure 16:
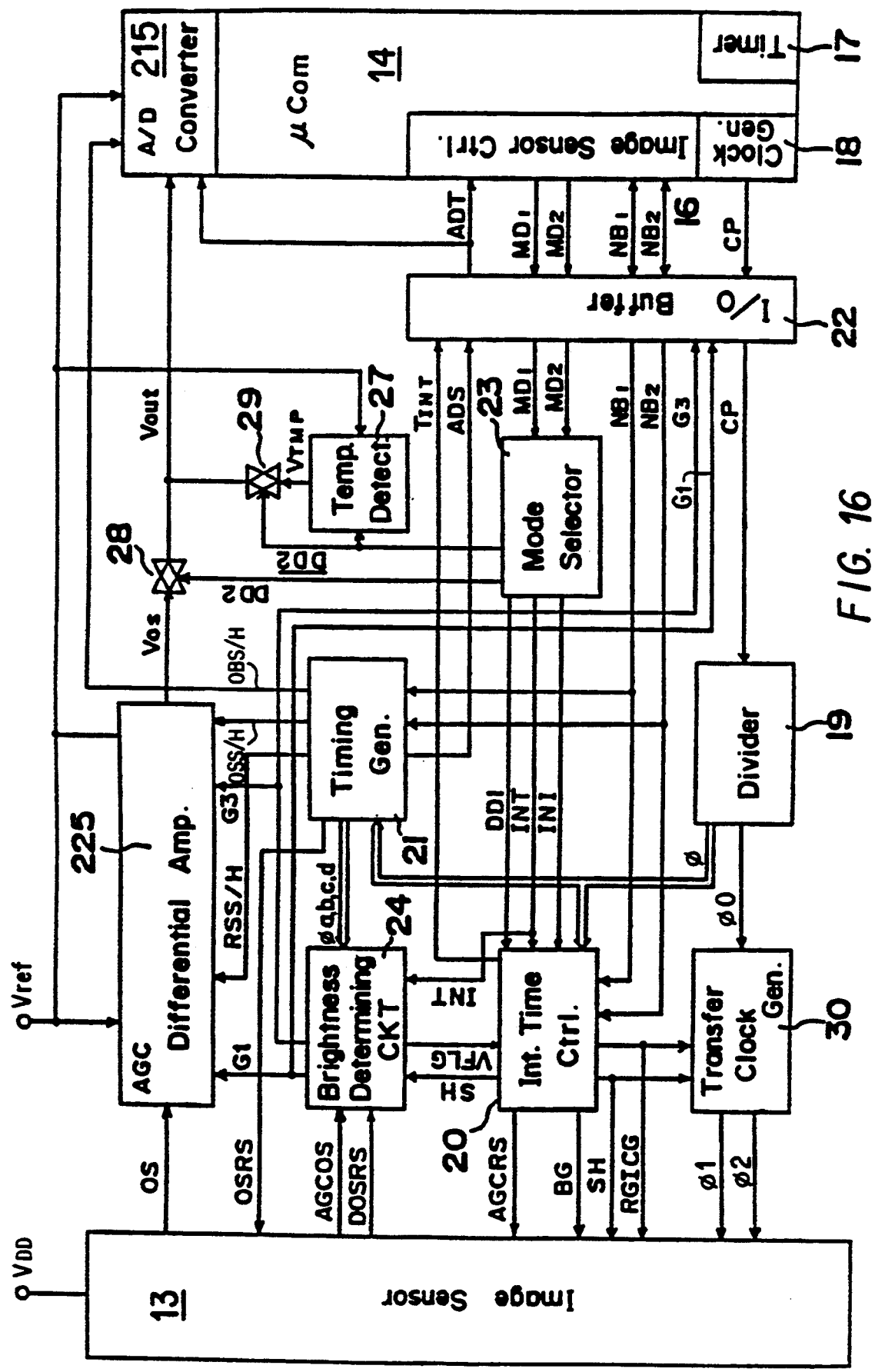
FIG. 16 is a block circuit diagram showing the solid-state imaging device according to a third preferred embodiment of the present invention.

Hereinafter, a third preferred embodiment of the present invention will be discussed with particular reference to FIGS. 16 to 18. The third embodiment of the present invention differs from any one of the first and second embodiments in respect of the dark output removing means. At the outset, the difference between the circuit block diagram of FIG. 16 and that of FIG. 2 will be described.

In the third embodiment of the present invention, the sample-hold pulse OBS/H of the dark reference picture element is inputted to the analog-to-digital converting device, that is, an analog-to-digital converter 215 and no OB subtracting AGC differential amplifier is employed. Also, in this third embodiment, the subtraction of the dark reference picture element is carried out in the analog-to-digital converter 215. FIG. 18 illustrates the details of the analog-to-digital converter 215 which includes an analog-to-digital converting circuit 206 and internal circuits formed on the same chip on which the converting circuit 206 is formed. The output of the image sensor which is inputted as Vin in FIG. 18 is composed of outputs of both of the dark reference picture elements and the effective picture elements. The output from the dark reference picture element is sampled and held by OBS/H pulse in a sample-hold circuit composed of a field effect transistor 201, a capacitor 202 and a buffer 203. The subsequently inputted output from the effective picture element is, after an output component of the dark reference picture element sampled and held has been subtracted by an operational amplifier 205 which is a subtracting means, inputted to the analog-to-digital converting circuit 206.

As hereinbefore described, the third embodiment of the present invention is such that the difference between the output from the effective picture element and that of the dark reference picture element, which is detected by the operational amplifier 205, is subjected to the analog-to-digital conversion and, therefore, the processing taking place on the part of the image sensor 13 can be simplified enough to simplify the circuit construction as a whole.

Figures 17A, 17B, 17C:
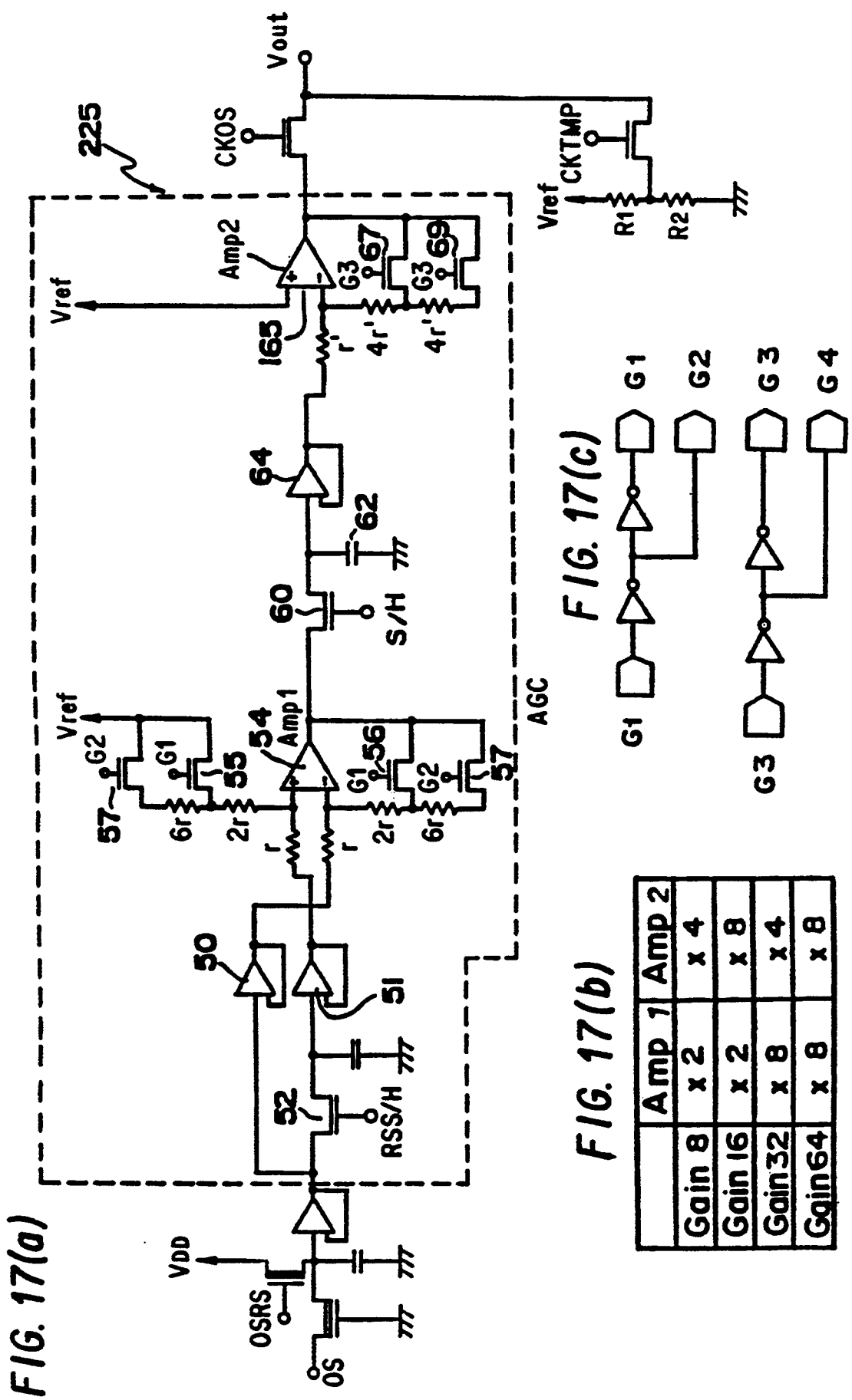
FIGS. 17a–17c are circuit diagrams of AGC operational amplifier used in the third embodiment of the present invention.

FIG. 17 illustrates AGC differential amplifier 225. While in the first embodiment of the present invention the sample-hold circuit for the output from the dark reference picture element has been used, this sample-hold circuit is removed in the third embodiment of the present invention. Also, as is the case with the second embodiment of the present invention, both of the outputs from the dark reference picture elements and the outputs from the effective picture elements are outputted from the same operational amplifier 165 and, therefore, the offset of this operational amplifier 165 can be cancelled.

Figure 19:
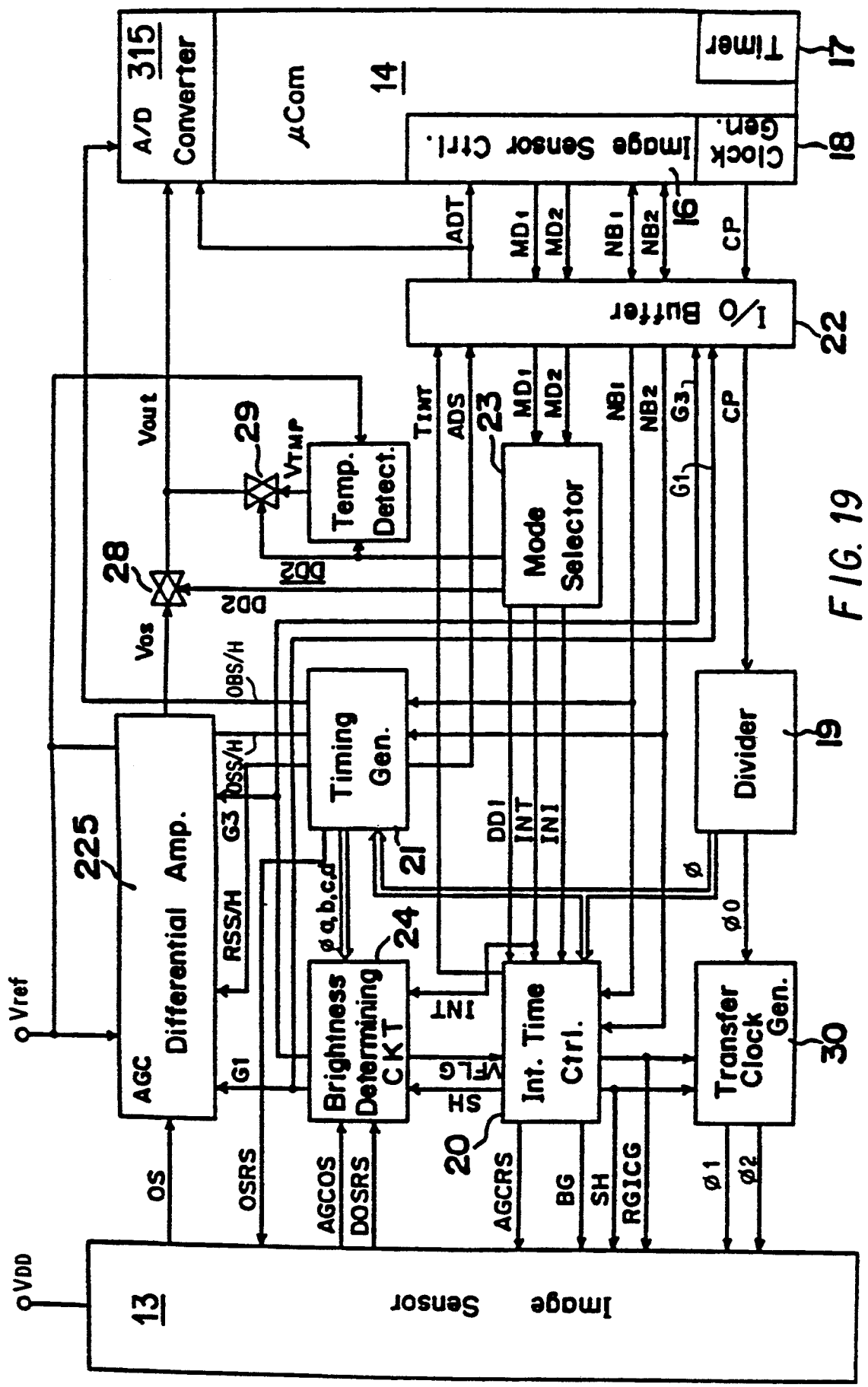
FIG. 19 is a block circuit diagram of the solid-state imaging device according to a fourth preferred embodiment of the present invention.

A fourth preferred embodiment of the present invention employing the dark output removing means which is different from that employed in any one of the foregoing embodiments will now be described. FIG. 19 illustrates a hardware block diagram of the fourth embodiment of the present invention which is similar to that shown in FIG. 16, associated with the third embodiment of the present invention, except that the reference voltage Vref is not inputted to an analog-to-digital converter 315. It is however to be noted that AGC differential amplifier 225 used therein is identical with that used in the third embodiment of the present invention.

Figure 20:
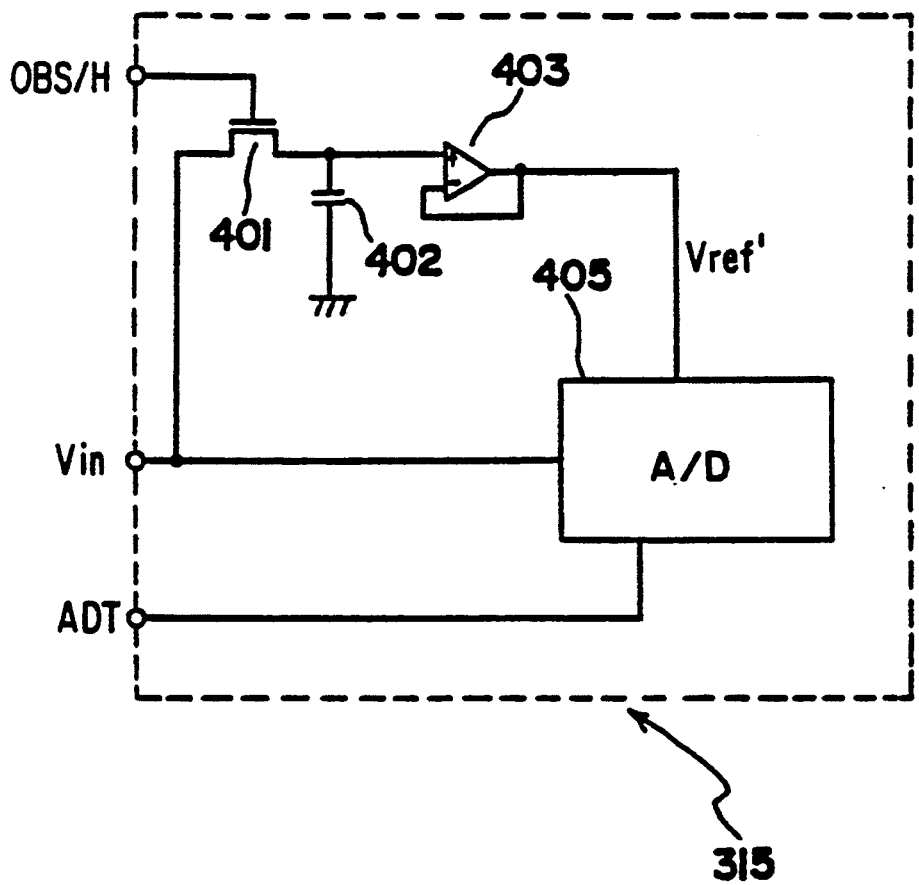
FIG. 20 is a circuit diagram of the analog-to-digital converter used in the fourth embodiment of the present invention.

A detailed construction of the analog-to-digital converter 315 is shown in FIG. 20. This analog-to-digital converter 315 includes an analog-to-digital converting circuit 405 and internal circuits formed on the same chip as the converting circuit 405. While the image sensor 13 is outputting the dark reference elements, OBS/H pulse is applied to the analog-to-digital converter 315 and the output from the dark reference picture element then inputted to a terminal Vin is sampled and held in a sample-hold circuit composed of a field effect transistor 401, a capacitor 402 and a buffer 403. The output from the dark reference picture element which has been held is inputted to the analog-to-digital converting circuit 405 as an analog reference voltage Vref'. Thereafter, the outputs from the effective picture elements of the image sensor 13 which are inputted to the terminal Vin are, after the output Vref' from the dark reference picture elements so held has been subtracted, subjected to the analog-to-digital conversion as is the case with the second preferred embodiment of the present invention. Thereby, the dark output component can be removed.

As hereinabove described, in the fourth preferred embodiment of the present invention, since the outputs from the dark reference picture elements are sampled and held and the analog-to-digital conversion is carried out in the analog-to-digital converting circuit 405 with the outputs from the dark reference picture element used as the analog reference voltage Vref', no operational amplifier for shifting the level of the output from the dark reference picture element towards the reference voltage is necessary and, therefore, the level shift offset can be rendered null.

Although the present invention has been fully described in connection with the various preferred embodiments thereof with reference to the accompanying drawings, it is to be noted that numerous changes and modifications are apparent to those skilled in the art. Such changes and modifications are to be understood as included within the scope of the present invention as defined by the appended claims unless they depart therefrom.

What is claimed is:

1. An image sensor provided on a chip, comprising:
   first means for receiving an image formed thereon, and for generating an image signal representing said image received;
   second means for receiving an image formed thereon, and for generating an image signal representing said image received, said second means being spaced apart from said first means;
   a circuit, provide on a predetermined space between said first and second means, for performing a predetermined function;
   means for outputting said image signal generated by said first and second receiving means and said circuit;
   means for amplifying said image signal outputted by said outputting means; and
   means for sending said image signal amplified by said amplifying means to the outside of said chip;
   wherein said amplifying means includes first amplifying means for amplifying said image signal outputted, and second amplifying means for amplifying said image signal amplified by said first amplifying means.

2. An image sensor as claimed in claim 1, wherein said amplifying means includes an operational amplifier for amplifying said image signal outputted.

3. An image sensor as claimed in claim 1, wherein said first amplifying means includes means for amplifying said image signal produced by said first and second receiving means by removing an error from said outputted image signal, the error being caused by fluctuation of voltage supplied to said image sensor, and wherein said second amplifying means includes means for amplifying said image signal amplified by said first amplifying means by removing an error from said image signal amplified by said first amplifying means, the error being caused by a current occurring in said image sensor.

4. An image sensor provided on a chip, comprising:
   first means located at a first position for receiving a first image formed thereon to produce a first image signal representing said image received, said first receiving means including a row of a plurality of light receiving elements;
   second means located at a second position spaced a distance from said first means in a direction parallel to the row of the light receiving elements of the first means for receiving a second image formed thereon to produce a second image signal representing said image received, said second receiving means including a row of a plurality of light receiving elements;
   a circuit, provided on a predetermined space between said first means and said second means, for performing a predetermined function; and
   means for sending said first and second image signals to the outside of said chip.

5. An image sensor as claimed in claim 4, wherein said plurality of light receiving elements included in said first and second receiving means are of the charge storage type, and wherein said circuit includes means for controlling the charge storage operation of said plurality of light receiving elements.

6. An image sensor as claimed in claim 5, wherein said controlling means includes:
   first means, provided laterally adjacent said first receiving means, for monitoring light received by said first receiving means;
   second means, provided laterally adjacent said second receiving means, for monitoring light received by said second receiving means; and
   means, provided on said predetermined space, for detecting brightness of said first image and that of said second image on the basis of the result of said first and second monitoring means.

7. An image sensor provided on a chip which comprises:
   a first charge-coupled light receiving means disposed at a first position and including a row of a plurality of first light receiving elements, said first light receiving means being operable to output a first image signal in response to receipt of a first image;
   a second charge-coupled light receiving means disposed at a second position separated by a spacing from said first light receiving means in a direction conforming to the row of the light receiving elements of the first light receiving means, said second light receiving means including a row of a plurality of second light receiving means in alignment with said row of said plurality of first light receiving elements and operable to output a second image signal in response to receipt of a second image;

a monitor means disposed in the space between the first and second light receiving means so as to receive substantially the same amount of light as falls on the first and second light receiving means, thereby to monitor respective amounts of light falling on the first and second light receiving means;

a control means for controlling respective lengths of time during which electric charges are stored in the first and second light receiving means depending on an output from the monitor means; and a shielding means for shielding a portion of said monitor means, said shielding means being laterally aligned in position with the spacing between the first and second light receiving means.

8. An image sensor provided on a chip which comprises:

a charge-coupled light receiving means including first and second spaced apart rows in the same horizontal line of light receiving elements and operable to output an image signal descriptive of an image formed thereon; and a unitary, elongated monitor means disposed in parallel with an in the space between the first and second rows of the light receiving elements so as to receive substantially the same amount of light as falls on the light receiving means, thereby to monitor the amount of light falling on the light receiving means and for outputting a light signal, said light signal being outputted from an intermediate position at the center of the monitor means.

* * * * *